(12) United States Patent
Toyazaki

(10) Patent No.: US 8,817,280 B2
(45) Date of Patent: Aug. 26, 2014

(54) PRINTING DEVICE AND METHOD OF CONTROLLING PRINTING DEVICE

(75) Inventor: Shigeru Toyazaki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 349 days.

(21) Appl. No.: 13/232,668

(22) Filed: Sep. 14, 2011

(65) Prior Publication Data

US 2012/0062930 A1   Mar. 15, 2012

(30) Foreign Application Priority Data

Sep. 15, 2010  (JP) ................................. 2010-207323
Sep. 6, 2011   (JP) ................................. 2011-194274

(51) Int. Cl.
*G06F 11/00* (2006.01)
*G06F 3/12* (2006.01)
*G06F 11/20* (2006.01)

(52) U.S. Cl.
USPC ......... 358/1.13; 358/1.15; 358/1.16; 358/1.1; 358/404; 714/6.13; 714/6.2; 700/2; 700/4; 700/82

(58) Field of Classification Search
CPC .  G06K 15/02; G06K 15/1886; G06K 3/1297; G06K 3/1275; G06K 3/121; G06K 3/126; G06K 3/1234; G06K 13/28; G06K 13/30; G06K 11/2094; G06K 11/2092; G06K 11/2089; H04N 1/46; H04N 1/3265; H04N 1/32641; H04N 1/32667
USPC ......... 358/1.1, 1.2, 1.11–1.18, 400–404, 406, 358/448, 504; 718/100–108, 1; 382/303–307; 714/100, 1–3, 4.11, 714/4.12, 4.2, 5.11, 6.1, 6.12, 6.13, 6.2, 714/6.22, 6.23, 6.3, 6.32
See application file for complete search history.

(56) References Cited

U.S. PATENT DOCUMENTS

| | | | |
|---|---|---|---|
| 6,411,396 B1 * | 6/2002 | Benson et al. | 358/1.18 |
| 7,072,052 B1 * | 7/2006 | Tanahashi et al. | 358/1.1 |
| 7,162,658 B2 * | 1/2007 | Golasky et al. | 714/6.12 |
| 8,184,304 B2 * | 5/2012 | Cyman et al. | 358/1.1 |
| 2004/0125391 A1 * | 7/2004 | Zuber | 358/1.9 |
| 2004/0184061 A1 * | 9/2004 | Christiansen | 358/1.13 |
| 2004/0196470 A1 * | 10/2004 | Christiansen | 358/1.1 |

FOREIGN PATENT DOCUMENTS

JP   2002-254763   9/2002
JP   2004-287519   10/2004

* cited by examiner

*Primary Examiner* — Chad Dickerson
(74) *Attorney, Agent, or Firm* — Oblon, Spivak, McClelland, Maier & Neustadt, L.L.P.

(57) ABSTRACT

A printing device includes a plurality of data transfer control units which store image data transferred from an upper level device in a storage unit; a plurality of output control units which are provided correspondingly to the data transfer control units and each of which controls printing of the image data stored by a specified one of the data transfer control units; and a print control unit that, when abnormality has occurred in any of the data transfer control units, transmits a transfer instruction on the image data that is to be transferred originally by the data transfer control unit being at fault, to an alternate data transfer control unit among the data transfer control units in which no abnormality has occurred, and instructs an output control unit corresponding to the data transfer control unit being at fault to print image data stored by the alternate data transfer control unit.

5 Claims, 16 Drawing Sheets

(TO IMAGE OUTPUT UNIT)

FIG.10

| No | CLASSIFICATION | NAME | DIRECTION (DFE↔PCTL) | CONTENTS |
|---|---|---|---|---|
| 1 | JOB INFORMATION | JOB START | ↔ | NOTIFICATION OF JOB START/RESPONSE<br>JOB IDENTIFIER (JOB ID) COMMUNICATION |
| 2 | | JOB END | ↔ | NOTIFICATION OF END OF ALL PRINTING PROCESSES REQUESTED BY CORRESPONDING JOB/RESPONSE<br>JOB IDENTIFIER (JOB ID) COMMUNICATION |
| 3 | | PRINTING PROCESS RECEPTION START | → | NOTIFY THAT PRINTER CAN RECEIVE PRINTING PROCESS |
| 4 | | PRINT INFORMATION REQUEST/ NOTIFICATION | ↔ | NEEDED PRINTER INFORMATION REQUEST/NOTIFICATION |
| 5 | | PRINTING PROCESS START | ↔ | NOTIFY THAT IMAGE DATA IS PREPARED/RESPONSE<br>OUTPUT ORDER, PAGE (PROCESS) UNIT |
| 6 | PRINTER STATE/ PRINTING PROCESS | PRINTING PROCESS REQUEST | ↔ | REQUEST PRINTING PROCESS BY PRINTER CONTROLLER/ RESPONSE<br>COLOR, PROCESS IDENTIFICATION NUMBER, PLANE IDENTIFICATION NUMBER<br>PLANE UNIT, REQEST IN REQUEST ORDER OF ENGINE<br>*BITMAP IS TAKEN FROM ENGINE |
| 7 | | DATA TRANSFER COMPLETION | ↑ | NOTIFY TRANSFER COMPLETION OF REQUESTED PLANE |
| 8 | | DATA RECEPTION COMPLETION | ↓ | NOTIFY RECEPTION COMPLETION OF REQUESTED PLANE |
| 9 | | PRINTING PROCESS COMPLETION | ↑ | COMPLETE PRINTING REQUEST FOR ALL PAGES (PROCESSES) |
| 10 | | PROCESS STATE REPORT | → | NOTIFY PRINTING STATE OF PROCESS<br>·FEEDING<br>·DISCHARGING<br>·PRINTING START |
| 11 | | SC NOTIFICATION ERROR GENERATION/RELEASE | ↔ ↑ | ACQUIRE/NOTIFY FAILURE INFORMATION OF PRINTER<br>NOTIFY FAILURE OCCURRENCE/RELEASE OF UPPER LEVEL DEVICE |
| 12 | PRINTING CONDITIONS | PRINTING CONDITION SETTING | ↔ | PRINTING CONDITION NOTIFICATION/RESPONSE<br>·PRINTING FORM (BOTH-SIDED PRINTING/SINGLE-SIDED PRINTING)<br>·PRINTING TYPE (DATA EXISTS/BLANK PAGE)<br>·FEEDING/DISCHARGING INFORMATION (FEEDING ORIGIN, DISCHARGING DESTINATION)<br>·PRINTING SURFACE ORDER (FRONT SURFACE→BACK SURFACE/ BACK SURFACE→FRONT SURFACE)<br>·PRINTING PAPER SIZE<br>·PRINT DATA SIZE<br>·RESOLUTION, GRADATION<br>·COLOR INFORMATION ETC. |
| 13 | CONNECTION | REGISTRATION/RELEASE | ↔ | MUTUAL REGISTRATION OF UPPER LEVEL DEVICE AND PRINTER CONTROLLER |

FIG.17

FALLBACK INFORMATION

| DATA TRANSFER CONTROL UNIT AT FAULT | ALTERNATE DATA TRANSFER CONTROL UNIT |
|---|---|
| Y | C |
| C | Y |
| M | K |
| K | M |
| Y, C | M, K |
| Y, M | C, K |
| Y, K | C, M |
| C, M | Y, K |
| C, K | Y, M |
| ... | ... |
| Y, C, M | K |
| Y, C, K | M |
| ... | ... |

FIG.18

FALLBACK INFORMATION

| DATA TRANSFER CONTROL UNIT AT FAULT | PAGE | ALTERNATE DATA TRANSFER CONTROL UNIT |
|---|---|---|
| Y | 1 | C |
| | 2 | M |
| | 3 | K |
| | ... | ... |
| C | 1 | Y |
| | 2 | K |
| | ... | ... |
| Y, C | 1 | M, K |
| | 2 | M |
| | ... | ... |
| Y, M | 1 | C |
| | 2 | C, K |
| | ... | ... |
| ... | ... | ... |

FIG. 19

| COLOR | CONTENTS | | SETTING CONTENTS |
|---|---|---|---|
| COMMON | PBID | | PAGE IDENTIFIER |
| | DATA AMOUNT FOR EACH PAGE | | NUMBER OF COLORS (MONOCHROME: 1, FULL COLOR: 4) |
| | FOR DATA TRANSFER | | |
| | | DATA TRANSFER ORIGIN ADDRESS | |
| | | DATA STORAGE DESTINATION ADDRESS | |
| | | DATA TRANSFER SIZE | BYTE SIZE INCLUDING BOUNDARY ADJUSTMENT SIZE (X*Y) |
| | FOR PRINTING | | |
| | | RESOLUTION | MAIN SCANNING: PRINTING RESOLUTION |
| | | | SUB SCANNING: PRINT RESOLUTION |
| | | GRADATION | NUMBER OF BITS FOR EACH PIXEL |
| | | PAPER FEEDING LENGTH | NUMBER OF DOTS OF PAPER FEEDING DIRECTION |
| | | PAPER WIDTH | NUMBER OF DOTS OF PAPER WIDTH DIRECTION |
| | | PRINTING SURFACE (FRONT SURFACE/BACK SURFACE) | PRINTING SURFACE |
| | | UPPER SIDE ON PRINTING PROHIBITED | PRINTING PROHIBITED AREA ON UPPER SIDE OF PAPER |
| | | LOWER SIDE ON PRINTING PROHIBITED | PRINTING PROHIBITED AREA ON LOWER SIDE OF PAPER |
| | | LEFT SIDE ON PRINTING PROHIBITED | PRINTING PROHIBITED AREA ON LEFT SIDE OF PAPER |
| | | RIGHT SIDE ON PRINTING PROHIBITED | PRINTING PROHIBITED AREA ON RIGHT SIDE OF PAPER |
| | | IMAGE INFORMATION | |
| | | BITMAP PRINTING POSITION X | ADDRESS BASED ON UPPER LEFT OF PAPER POINT |
| | | BITMAP PRINTING POSITION Y | ADDRESS BASED ON UPPER LEFT OF PAPER POINT |
| | | X DIRECTION EFFECTIVE SIZE | EFFECTIVE SIZE EXCLUDING BOUNDARY ADJUSTMENT |
| | | Y DIRECTION EFFECTIVE SIZE | |
| C | Color IDENTIFIER | | CYAN |
| | FOR DATA TRANSFER | | |
| | | DATA TRANSFER NECESSITY/NON-NECESSITY | SET DATA TRANSFER OF ALL COLORS TO "NON-NECESSITY" IN CASE OF WHITE PAPER |
| | | | SET DATA TRANSFER TO "NON-NECESSITY" FOR COLORS OTHER THAN COLORS SPECIFIED BY color |
| | FOR PRINTING | | |
| | | PRINTING NECESSITY/NON-NECESSITY | SET PRINTING OF ALL COLORS TO "NON-NECESSITY" IN CASE OF WHITE PAPER |
| | | | SET PRINTING "NON-NECESSITY" FOR COLORS OTHER THAN COLORS SPECIFIED BY color |
| | FALLBACK FLAG | | FALLBACK PRINTING: ON  FALLBACK PRINTING: OFF |
| M | EQUAL TO C (Color IDENTIFIER IS MAGENTA) | | |
| Y | EQUAL TO C (Color IDENTIFIER IS YELLOW) | | |
| K | EQUAL TO C (Color IDENTIFIER IS BLACK) | | |

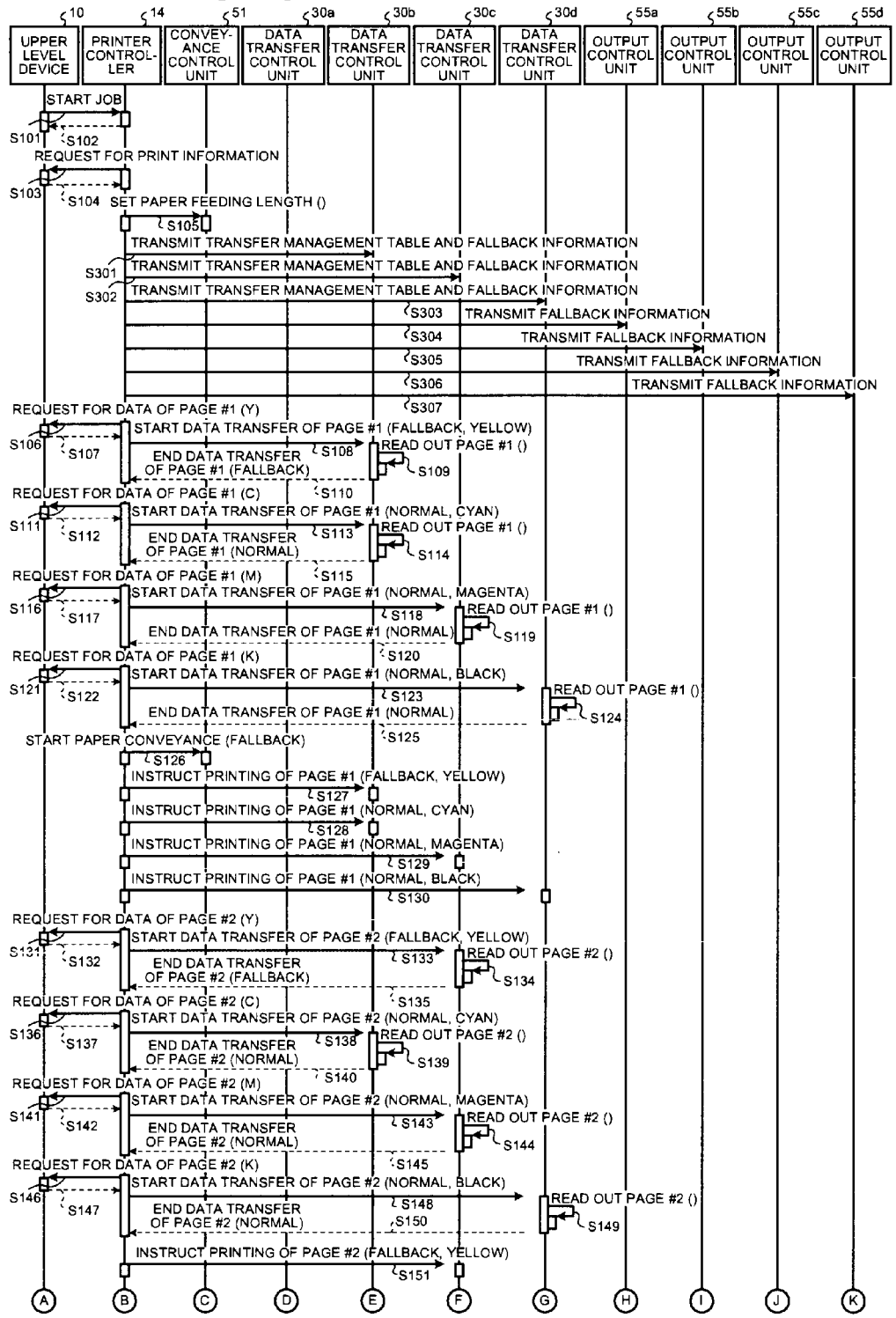

PRINTING DEVICE AND METHOD OF CONTROLLING PRINTING DEVICE

CROSS-REFERENCE TO RELATED APPLICATIONS

The present application claims priority to and incorporates by reference the entire contents of Japanese Patent Application No. 2010-207323 filed in Japan on Sep. 15, 2010 and Japanese Patent Application No. 2011-194274 filed in Japan on Sep. 6, 2011.

BACKGROUND OF THE INVENTION

1. Field of the Invention

The present invention relates to a printing device that performs printing according to print image data transmitted from an upper level device and a method of controlling a printing device.

2. Description of the Related Art

As an image forming system, a system has been known which includes an image forming apparatus and a DFE (Digital Front End Processor) server that is an upper level device for sending print data to the image forming apparatus and instructing the image forming apparatus to perform printing. There is also a known system in which a DFE server provided with a drawing function generates a raster image by using a raster image processor (RIP), on the basis of print data written in PDL (Page Description Language) that is transmitted from an upper level device, and transfers the generated raster image to an image forming apparatus (see, for example, Japanese Patent Application Laid-open No. 2004-287519).

Different from the image forming apparatus described above, a printer device provided with a printer controller, a printer engine, and data lines to connect the printer controller to the printer engine is known (see, for example, Japanese Patent Application Laid-open No. 2002-254763). In the printer device, a control line used for exchanging various types of control information is separate from the data lines used for exchanging print data, in order to realize a high-speed data transfer.

In Japanese Patent Application Laid-open No. 2002-254763, the configuration is disclosed in which the control line and the data lines between the printer controller and the printer engine are separate from each other in order to increase a printing speed of the printer device as a whole. Furthermore, the data lines between the printer controller and the printer engine are separate for each color. Therefore, it is possible to transfer pieces of print data of respective color components in parallel, enabling to realize the high-speed data transfer.

If the configuration as disclosed in Japanese Patent Application Laid-open No. 2002-254763, in which the control line is separate from the data lines and the data lines are separate for each color, is applied to the image forming system as disclosed in Japanese Patent Application Laid-open No. 2004-287519, it may be possible to realize a high-speed data transfer between the DFE server and the image forming apparatus.

However, in the image forming system with the above configuration, if a failure occurs in a control unit (a data transfer control unit) that controls data transfer, it becomes impossible to transfer data to an output unit (for example, a head) on the downstream side of the data transfer control unit. Therefore, it is needed to suspend the operation of the image forming system and cope with the failure of the data transfer control unit (for example, replace the data transfer control unit when the failure is due to a hardware problem or re-install software when the failure is due to a software problem). That is, there is a problem in that there is no effective method of coping with the failure of the data transfer control unit but to interrupt the operation of the image forming system.

SUMMARY OF THE INVENTION

It is an object of the present invention to at least partially solve the problems in the conventional technology.

According to an aspect of the present invention, there is provided a printing device that includes a plurality of data transfer control units, each of which stores image data transferred from an upper level device in a storage unit; a plurality of output control units which are provided correspondingly to the data transfer control units and each of which controls printing of the image data stored by a specified one of the data transfer control units; and a print control unit that, when abnormality has occurred in any of the data transfer control units, transmits a transfer instruction on the image data that is to be transferred originally by the data transfer control unit in which the abnormality has occurred, to an alternate data transfer control unit among the data transfer control units in which no abnormality has occurred, and instructs an output control unit corresponding to the data transfer control unit in which the abnormality has occurred to print the image data that is stored by the alternate data transfer control unit.

According to another aspect of the present invention, there is provided a method of controlling a printing device that includes storing, by a plurality of data transfer control units, image data transferred from an upper level device in a storage unit; controlling, by each of output control units provided correspondingly to the data transfer controls units, printing of the image data stored by a specified one of the data transfer control units; and controlling, when abnormality has occurred in any of the data transfer control units, by the data transfer control unit in which the abnormality has occurred, transmission of a transfer instruction on the image data that is to be transferred originally by the data transfer control unit in which the abnormality has occurred, to an alternate data transfer control unit among the data transfer control units in which no abnormality has occurred, and transmission of an instruction to an output control unit corresponding to the data transfer control unit in which the abnormality has occurred to perform printing of the image data that is stored by the alternate data transfer control unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a schematic diagram illustrating an example of control information that is transmitted and received between the upper level device and the printer controller of the printer device;

FIG. 17 is an explanatory diagram illustrating an example of fallback information;

FIG. 18 is an explanatory diagram illustrating an example of fallback information used when an alternate data transfer control unit is changed for each page;

FIG. 19 is a diagram illustrating an example of a transfer management table according to the embodiment;

FIG. 20 is a sequence diagram illustrating an example of a printing process according to the embodiment.

DETAILED DESCRIPTION OF THE PREFERRED EMBODIMENTS

Exemplary embodiments of a printing device and a method of controlling the printing device according to the present invention will be explained in detail below with reference to the accompanying drawings.

The printing device according to an embodiment includes a plurality of data transfer control units that cause an upper level device to transfer image data, in order to realize a high-speed data transfer between the upper level device and the printing device. Furthermore, when abnormality occurs in any of the data transfer control units, the printing device causes any of the other data transfer control units in which no abnormality occurs to transfer image data as an alternative. Therefore, even when a data transfer control unit that controls data transfer is at fault, it is possible to continue operations.

Hereinafter, embodiments of a printing system according to the present invention will be described in detail with reference to the accompanying drawings. First, in order to help with understanding, production printing to which a printing system according to each embodiment is applied will be schematically described. In general, the production printing is used when a large capacity of printing is performed in a short time. For this reason, in the production printing, there is constructed a work flow system for controlling from a print data generation to a print distribution, in order to efficiently perform a job control or a print data control, as well as improving the print speed.

The print system according to each embodiment involves a part for implementing the print operation in the work flow for the production printing. In the system, a process using the RIP (hereinafter may be called "RIP process") is performed by a device different from a device for printing the bitmap data obtained through the RIP process. Since the RIP process requires the most long processing time in the printing process, it is possible to improve the print speed by performing the RIP process and the printing process by different devices.

Outline of Printing System Applicable to Each Embodiment

Figure 1:
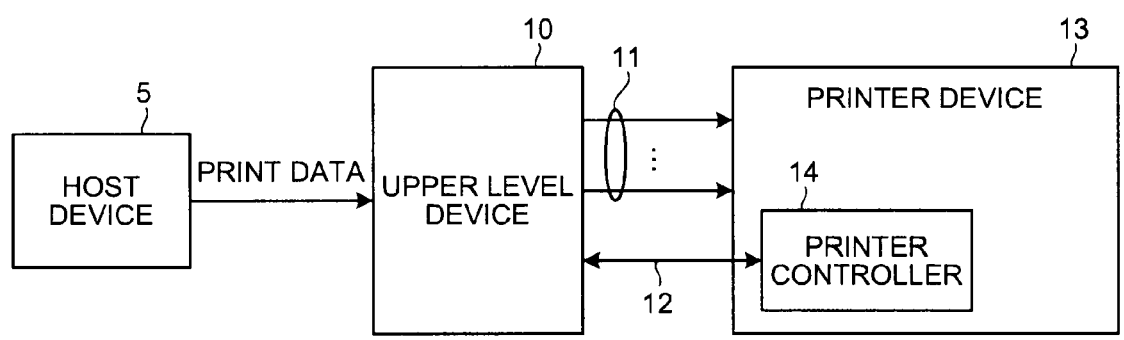
FIG. 1 is a block diagram illustrating an example of the configuration of a printing system that can be applied to an embodiment.

FIG. 1 illustrates an example of the configuration of a printing system that can be applied to this embodiment. The printing system is provided with an upper level device 10, a printer device 13 as an image forming device, a plurality of data lines 11, and a control line 12. The upper level device 10 is connected with the printer device 13 via the plurality of data lines 11 and the control line 12. A host device 5 may be a computer for example to generate print job data including print image data and print set information.

The print job data may include data written in PDL (hereinafter referred to as "PDL data") for example. The print set information relating to the print setting including print page information, layout information, print run information, as well as the print image data composed of the bitmap image for printing, is generated by interpreting the PDL data.

The upper level device 10 performs the RIP process in accordance with the print job data supplied from the host device 5 to generate the each color bitmap data as print image data. Along with that, the upper level device 10 generates control information for controlling the print operation, on the basis of the print job data and the information from the host device 5.

The print image data for each color generated by the upper level device 10 is supplied to a printer engine unit (not shown) of the printer device 13 through the plurality of data lines 11. Between the upper level device 10 and a printer controller 14, the control information for controlling the print operation is transmitted/received through the control line 12. The printer controller 14 controls the printer engine unit on the basis of the transmitted/received control information to form an image on a print medium, thereby perform the print operation according to the print job. Incidentally, the specific example of the control information will be described later with reference to FIG. 10.

The printing method is not limited in particular. However, in each embodiment, printing paper is used as the printing medium and a printing image is formed on the printing paper using an inkjet system. However, the present invention is not limited thereto and each embodiment can be applied to the printing device that forms a printing image on the printing paper using toner. As the printing paper, continuous paper (continuous stationery) where perforations to be cut are provided at a predetermined interval is used. In the production printing, the continuous paper is mainly used as the printing paper. However, the present invention is not limited thereto and cut paper where a size is fixed to an A4 size or a B4 size may be used as the printing paper. In the continuous paper, a page means a region that is interposed by perforations provided at a predetermined interval.

The printing medium that is printed by a printing system according to each embodiment is not limited to printing paper such as paper. That is, other printing media that can be printed by a printing system applied to each embodiment and can be provided as a roll may be used. For example, a plastic film or cloth may be used as the printing medium.

Upper Level Device

Figure 2:
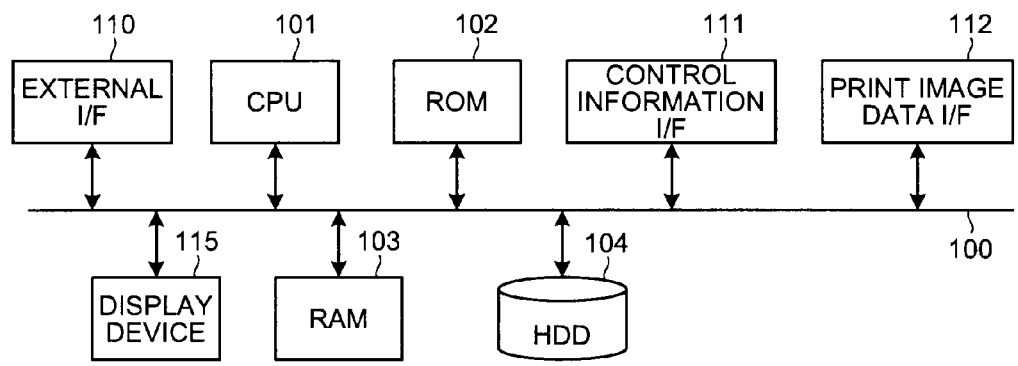
FIG. 2 is a block diagram illustrating an example of the configuration of an upper level device.

FIG. 2 illustrates an example of the configuration of the upper level device 10. A control processing unit (CPU) 101, a read only memory (ROM) 102, a random access memory (RAM) 103, and a hard disk drive (HDD) 104 are connected to a bus 100. An external I/F 110, a control information I/F 111, a print image data I/F 112, and a display device 115 are connected to the bus 100. The individual units that are connected to the bus 100 can communicate with each other through the bus 100.

In the ROM 102 and the HDD 104, a program to operate the CPU 101 is stored in advance. The RAM 103 is used as a work memory of the CPU 101. That is, the CPU 101 uses the RAM 103 as the work memory according to the program stored in the ROM 102 and the HDD 104 and controls all the operations of the upper level device 10. The display device 115 displays various screens under the control by the CPU 101 or the like.

The external I/F 110 corresponds to, for example, a transmission control protocol/Internet Protocol (TCP/IP) and controls communication with the host device 5. The control information I/F 111 controls communication of control information. Since the print image data I/F 112 controls communication of print image data, the print image data I/F 112 has plural channels. For example, print image data of each color such as yellow (Y), cyan (C), and magenta (M), and black (K) that is generated in the upper level device 10 is output from the plural channels. Since a high-speed transmission speed is required in the print image data I/F 112, the peripheral component interconnect bus express (PCI Express) may be employed. A type of the control information I/F 111 is not limited in particular. However, in this case, similar to the print image data I/F 112, the PCI Express is used.

In this configuration, print job data that is transmitted from the host device 5 is received in the external I/F 110 of the upper level device 10 and is stored in the HDD 104 through the CPU 101. The CPU 101 executes the RIP process on the basis of the print job data read from the HDD 104, generates bitmap data of each color, and writes the bitmap data in the RAM 103. For example, the CPU 101 renders page description language (PDL) data by the RIP process, generates bitmap data of each color, and writes the bitmap data in the RAM 103. The CPU 101 compresses and encodes the bitmap data of each color that is written in the RAM 103 and temporarily stores the bitmap data in the HDD 104.

For example, when a print operation starts in the printer device 13, the CPU 101 reads the compressed and encoded bitmap data of each color from the HDD 104, decodes the compressed code, and writes the extended bitmap data of each color in the RAM 103. The CPU 101 reads the bitmap data of each color from the RAM 103, outputs the bitmap data as the print image data of each color from each channel of the print image data I/F 112, and supplies the bitmap data to the printer device 13. The CPU 101 transmits/receives control information to control printing through the control information I/F 111 between the CPU 101 and the printer device 13, according to a progress situation of the print operation.

Figure 3:
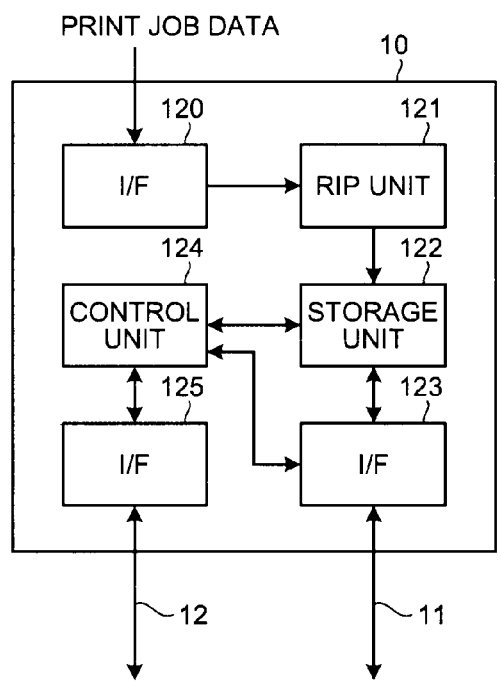
FIG. 3 is a functional block diagram illustrating an example of a function of the upper level device.

FIG. 3 is a functional block diagram illustrating an example of a function of the upper level device 10. The upper level device 10 includes interfaces (I/F) 120, 123, and 125, an RIP unit 121, a storage unit 122, and a control unit 124. The interfaces 120, 123, and 125 correspond to the external I/F 110, the print image data I/F 112, and the control information I/F 111, respectively. The RIP unit 121 and the control unit 124 are configured by a program operating on the CPU 101 in FIG. 2. The storage unit 122 corresponds to at least one of the RAM 103 or the HDD 104 in FIG. 2.

The print job data that includes the PDL data is generated by the host device 5 and is transmitted to the upper level device 10. The print job data is received in the interface 120 and is supplied to the RIP unit 121. The RIP unit 121 performs rendering on the basis of the PDL data included in the supplied print job data and generates print image data based on the bitmap data of each color of Y, C, M, and K. The RIP unit 121 sequentially stores the generated print image data of each color of Y, C, M, and K in the storage unit 122.

The control unit 124 communicates with the printer controller 14 of the printer device 13 through the interface 125. For example, the control unit 124 generates control information to control printing in the printer device 13, on the basis of the print job data supplied from the host device 5 through the interface 120. The control information is transmitted from the control unit 124 to the printer controller 14 through the interface 125.

The interface 123 is configured to have independent access to the print image data of each color of Y, C, M, and K stored in the storage unit 122. The interface 123 is connected to the printer device 13 through the plurality of data lines 11 corresponding to the individual colors of Y, C, M, and K, and exchanges control information related to print image data transfer of each color of Y, C, M, and K between the interface 123 and the printer device 13 or transmits print image data of each color of Y, C, M, and K.

Printer Device

Figure 4:
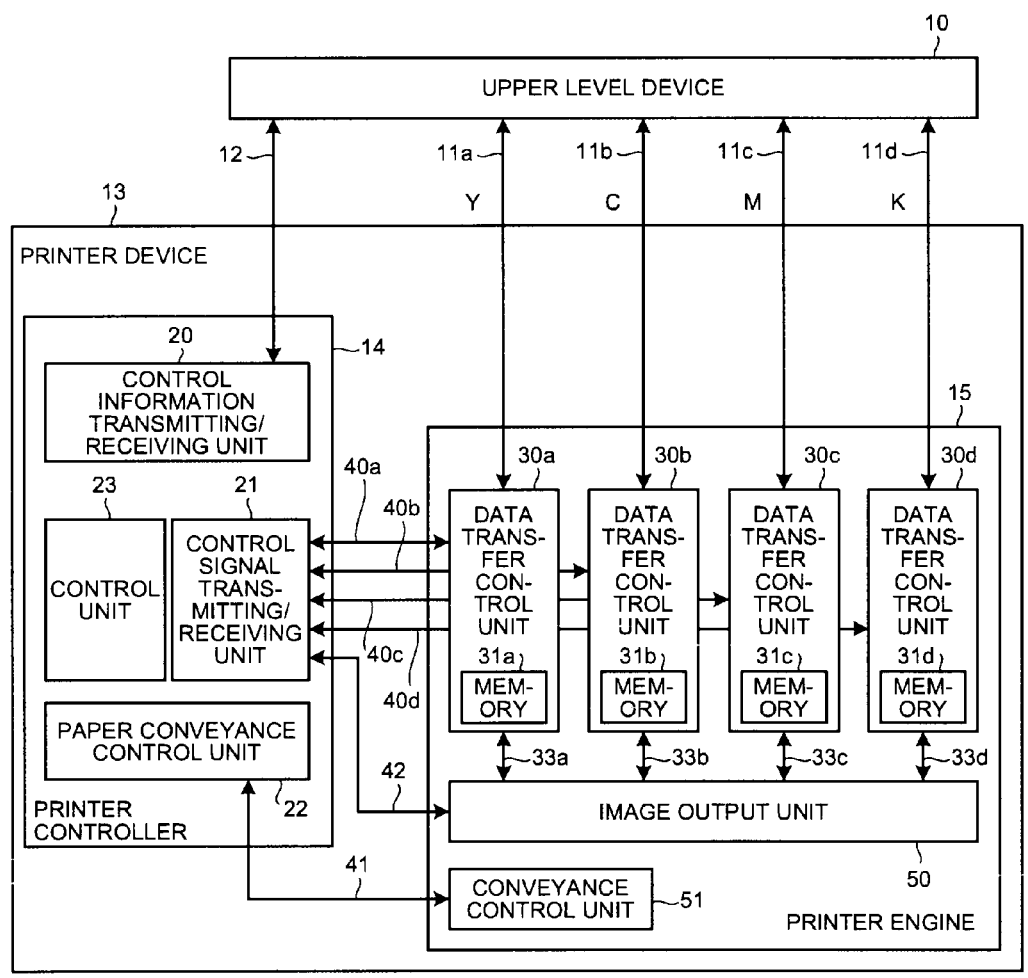
FIG. 4 is a block diagram illustrating an example of the configuration of a printer device.

FIG. 4 illustrates an example of the configuration of the printer device 13. The printer device 13 includes a printer controller 14 and a printer engine 15. The printer controller 14 is connected to the control line 12, and exchanges control information with the upper level device 10 through the control line 12 to control a print operation. The printer engine 15 is connected to plurality of data lines 11a, 11b, 11c, and 11d and executes a printing process of print image data of each color that is transmitted from the upper level device 10 through the data lines 11a, 11b, 11c, and 11d according to the control of the printer controller 14.

The printer controller 14 and the printer engine 15 will be described in more detail. The printer controller 14 includes a control information transmitting/receiving unit 20, a control signal transmitting/receiving unit 21, a paper conveyance control unit 22, and a control unit 23.

The control information transmitting/receiving unit 20 exchanges control information to control printing with the upper level device 10 through the control line 12. The control signal transmitting/receiving unit 21 is connected to data transfer control units 30a, 30b, 30c, and 30d to be described below through engine I/F control lines 40a, 40b, 40c, and 40d. The control signal transmitting/receiving unit 21 exchanges a control signal individually with the data transfer control units 30a, 30b, 30c, and 30d. The control signal transmitting/receiving unit 21 is connected to output control units 55a to 55d of an image output unit 50, which will be described below, via a control line 42. The paper conveyance control unit 22 is connected to a conveyance control unit 51 to be described below through a conveyance control line 41 and exchanges a control signal with the conveyance control unit 51 to control paper conveyance.

The control unit 23 includes a CPU, a ROM, and a RAM, and uses the RAM as a work memory to control the individual units of the printer controller 14 according to a program previously stored in the ROM. The control unit 23 analyzes control information that is transmitted from the upper level device 10 and is received by the control information transmitting/receiving unit 20 and delivers the control information to the control signal transmitting/receiving unit 21 or the paper conveyance control unit 22.

The control information transmitting/receiving unit 20, the control signal transmitting/receiving unit 21, and the paper conveyance control unit 22 may be configured as hardware controlled by the control unit 23 and may be configured as a program module that operates on the control unit 23.

Figure 5:
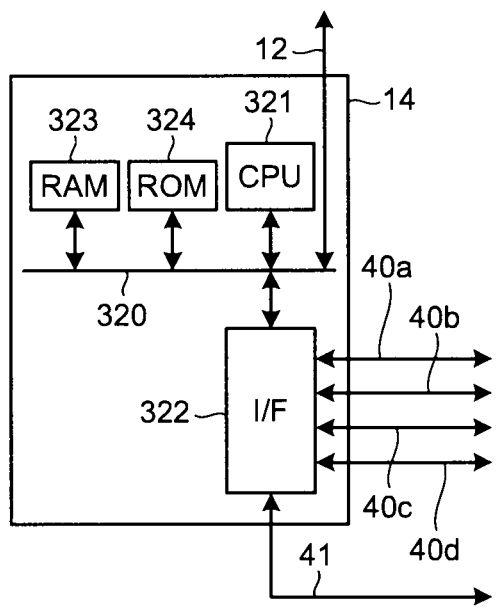
FIG. 5 is a block diagram illustrating an example of the configuration of a printer controller.

FIG. 5 illustrates an example of the hardware configuration of the printer controller 14. The printer controller 14 includes a CPU 321, an interface (I/F) 322, a RAM 323, and a ROM 324. The CPU 321, the interface (I/F) 322, the RAM 323, and the ROM 324 are connected to a bus 320 such that they can communicate with each other. To the bus 320, a control line 12 is also connected through a communication I/F not illustrated in the drawings. The CPU 321 operates using the RAM 323 as the work memory according to the program stored in the ROM 324 and controls all the operations of the printer device 13. The interface 322 includes a logic circuit that is configured in a hardware manner and controls communication with a printer controller 14, data transfer control units 30a, 30b, 30c, and 30d and a conveyance control unit 51.

In this configuration, for example, functions of the control signal transmitting/receiving unit 21 and the paper conveyance control unit 22 illustrated in FIG. 4 are realized by the I/F 322. The function of the control unit 23 is realized by the program operated on the CPU 321. The function of the control information transmitting/receiving unit 20 is realized by a communication I/F not illustrated in the drawings and the bus 320.

Returning to the description of FIG. 4, the printer engine 15 includes the plurality of data transfer control units 30a, 30b, 30c, and 30d that have the same configuration, the image output unit 50 that outputs an image based on the print image data to paper and forms an image, and a conveyance control unit 51 that controls conveyance of printing paper.

The data lines 11a, 11b, 11c, and 11d are connected to the data transfer control units 30a, 30b, 30c, and 30d, respectively. The data transfer control units 30a, 30b, 30c, and 30d include memories 31a, 31b, 31c, and 31d, respectively, and store the print image data of the individual colors transmitted from the upper level device 10 through the data lines 11a, 11b, 11c, and 11d in the memories 31a, 31b, 31c, and 31d.

Each of the memories 31a, 31b, 31c, and 31d has the same memory capacity and the same address configuration. Each of the memories 31a, 31b, 31c, and 31d preferably has the memory capacity that can store print image data of at least three pages. For example, the three pages of the print image data correspond to print image data of a page during transmission from the upper level device 10, print image data of a page during an output, and print image data of the next page. However, the present invention is not limited thereto and each of the memories 31a, 31b, 31c, and 31d may store print image data of two pages or less.

The data transfer control units 30a, 30b, 30c, and 30d are connected to the control signal transmitting/receiving unit 21 by engine I/F control lines 40a, 40b, 40c, and 40d, respectively. The control signal transmitting/receiving unit 21 can transmit/receive a control signal between the data transfer control units 30a, 30b, 30c, and 30d through the engine I/F control lines 40a, 40b, 40c, and 40d.

Figure 6:
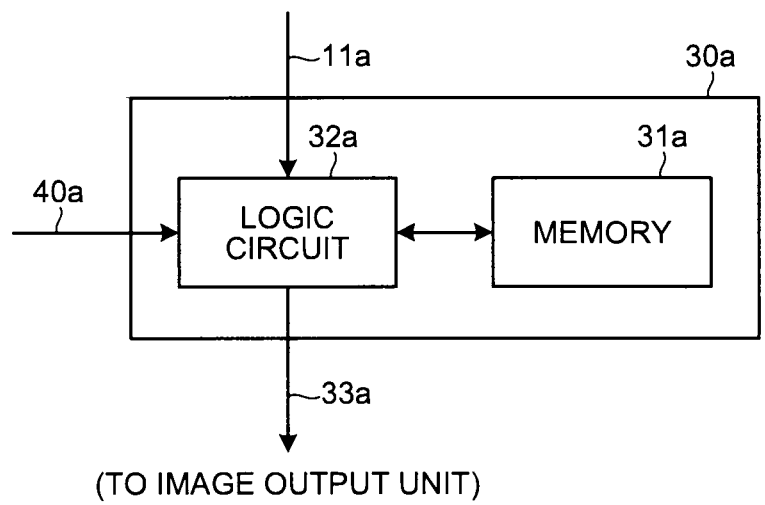
FIG. 6 is a block diagram schematically illustrating an example of the configuration of a data transfer control unit.

FIG. 6 schematically illustrates an example of the configuration of the data transfer control unit 30a. Since the common configuration is applied to the data transfer control units 30a, 30b, 30c, and 30d, the configuration of the data transfer control unit 30a among the data transfer control units 30a, 30b, 30c, and 30d is illustrated representatively in FIG. 6.

The data transfer control unit 30a includes a memory 31a and a logic circuit 32a. The engine I/F control line 40a and the data line 11a are connected to the logic circuit 32a. The logic circuit 32a stores the print image data transmitted from the upper level device 10 through the data line 11a in the memory 31a, according to the control signal received from the control signal transmitting/receiving unit 21 through the engine I/F control line 40a. Likewise, the logic circuit 32a reads the print image data from the memory 31a according to a control signal received from the control signal transmitting/receiving unit 21 through the engine I/F control line 40a and supplies the print image data to an image output unit 50 to be described through an output line 33a.

The control by the logic circuit 32a that is configured in a hardware manner with a combination of logic circuits is advantageous in that a high-speed process can be executed, over the control by a CPU which uses interrupts to make a program diverge into processes. For example, the logic circuit 32a performs logic determination with respect to a control signal based on a bit string that is received through the engine I/F control line 40a and determines a process to be executed. However, the present invention is not limited thereto and the same function as that of the logic circuit 32a may be realized in a hardware manner using the CPU.

The print image data of the individual colors that are output from the data transfer control units 30a, 30b, 30c, and 30d is supplied to the image output unit 50. The image output unit 50 executes printing based on the print image data of each color. In each embodiment, printing of the print image data is performed by an inkjet system that ejects ink from nozzles in heads and performs printing. However, the printing system is not limited to the inkjet system and a laser printer system may be used.

Figure 7:
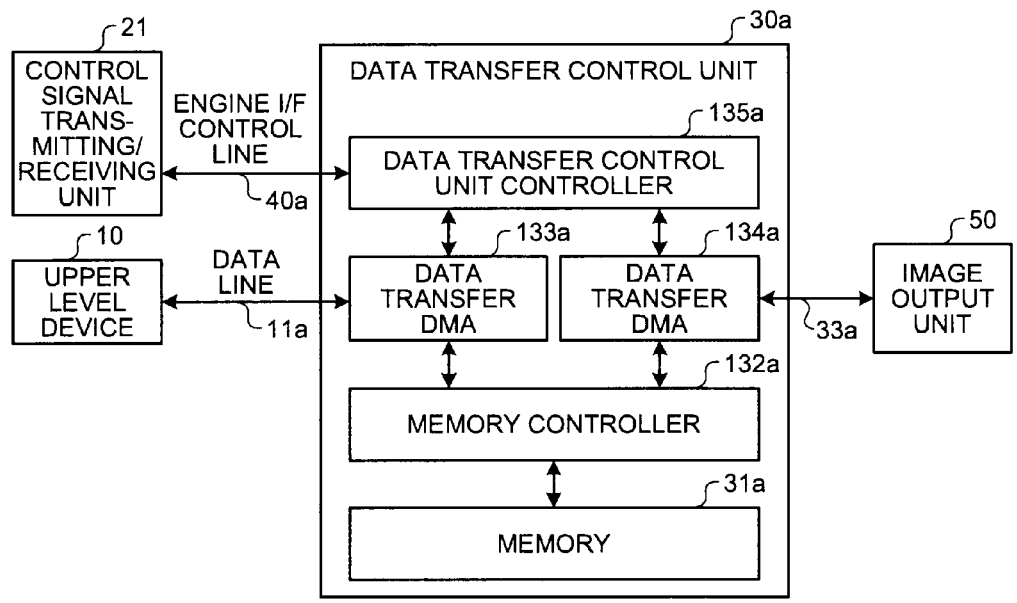
FIG. 7 is a block diagram specifically illustrating an example of the configuration of the data transfer control unit.

FIG. 7 specifically illustrates an example of the configuration of the data transfer control unit 30a. In FIG. 7, components that are common to those of FIG. 6 are denoted by the same reference numerals and the redundant description will not be repeated. The data transfer control unit 30a includes a memory 31a, a memory controller 132a, data transfer direct memory accesses (DMA) 133a and 134a, and a data transfer control unit controller 135a. Among these components, the memory controller 132a, the data transfer DMAs 133a and 134a, and the data transfer control unit controller 135a are included in the logic circuit 32a illustrated in FIG. 6.

The memory controller 132a controls access with respect to the memory 31a. The data transfer DMA 133a receives print image data from the upper level device 10 and writes the print image data in the memory 31a through the memory controller 132a. The data transfer DMA 134a reads data from the memory 31a through the memory controller 132a and transmits the data to the image output unit 50 through the output line 33a. The data transfer control unit controller 135a receives control information that is transmitted from the control signal transmitting/receiving unit 21 in the printer controller 14 through the engine I/F control line 40a and controls the data transfer DMAs 133a and 134a according to the received control information.

For example, once a data transfer start request transmitted from the control signal transmitting/receiving unit 21 is received in the data transfer control unit controller 135a through the engine I/F control line 40a, the data transfer control unit controller 135a instructs the data transfer DMA 133a to start to transmit data, according to the data transfer start request. The data transfer DMA 133a transmits the data transfer request to the upper level device 10 through the data line 11a according to the instruction. For example, the data that is transmitted from the upper level device 10 according to the data transfer request is received in the data transfer DMA 133*a* and is written at a predetermined address of the memory 31*a* through the memory controller 132*a*.

Once the printing instruction that is transmitted from the control signal transmitting/receiving unit 21 is received in the data transfer control unit controller 135*a* through the engine I/F control line 40*a*, the data transfer control unit controller 135*a* instructs the data transfer DMA 134*a* to read data from the memory 31*a*. The data transfer DMA 134*a* reads data from the memory 31*a* through the memory controller 132*a*, according to the instruction. The data transfer DMA 134*a* transmits the read data to the image output unit 50 through the output line 33*a*.

Figure 8:
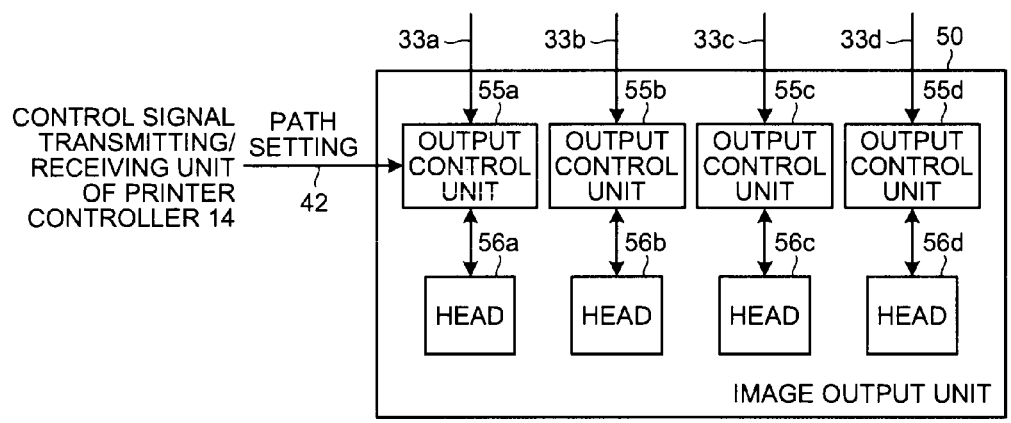
FIG. 8 is a block diagram illustrating an example of the configuration of an image output unit.

FIG. 8 illustrates an example of the configuration of the image output unit 50. The image output unit 50 includes four output control units 55*a*, 55*b*, 55*c*, and 55*d* corresponding to the respective data transfer control units 30*a*, 30*b*, 30*c*, and 30*d*; and heads 56*a*, 56*b*, 56*c*, and 56*d* of the individual colors of Y, C, M, and K. A relation between the colors and the heads 56*a* to 56*d* is not limited to this example. Each of the output control units 55*a* to 55*d* is connected to the control signal transmitting/receiving unit 21 of the printer controller 14 via the control line 42. The output control units 55*a*, 55*b*, 55*c*, and 55*d* control connection and disconnection of output lines 33*a* to 33*d* to which print image data of the data transfer control units 30*a*, 30*b*, 30*c*, and 30*d* is output and the heads 56*a*, 56*b*, 56*c*, and 56*d*, respectively. That is, each of the output control units 55*a* to 55*d* can set a path such that each of the heads 56*a* to 56*d* is connected to any of the output lines 33*a* to 33*d*.

For example, the output control units 55*a* to 55*d* may set the output lines 33*a*, 33*b*, 33*c*, and 33*d* and the heads 56*a*, 56*b*, 56*c*, and 56*d* to be connected in a one-to-one relation. Further, the output lines 33*a*, 33*b*, 33*c*, and 33*d* may be set to be connected to the heads 56*a*, 56*b*, 56*c*, and 56*d* in a one-to-multiple relation, such that the heads 56*a*, 56*b*, 56*c*, and 56*d* are connected to the output line 33*a*.

Paths to connect the output lines 33*a*, 33*b*, 33*c*, and 33*d* with the heads 56*a*, 56*b*, 56*c*, and 56*d* may be set by an operation from the user using a DIP switch. However, the present invention is not limited thereto and the paths may be set by a control signal from the control signal transmitting/receiving unit 21.

As described above, in the printer device 13 according to each embodiment, transmission of the print image data from the upper level device 10 and transmission/reception of a control signal to control printing of the print image data between the upper level device 10 and the printer device 13 are performed through different paths. The print image data of the individual colors is transmitted from the upper level device 10 through the different data lines 11*a*, 11*b*, 11*c*, and 11*d* and the print image data of the individual colors that is transmitted through the data lines 11*a*, 11*b*, 11*c*, and 11*d* is independently controlled and is supplied to the data transfer control units 30*a*, 30*b*, 30*c*, and 30*d* that have the same configuration. Further, in the image output unit 50, connection paths of outputs of the data transfer control units 30*a*, 30*b*, 30*c*, and 30*d* and the heads 56*a*, 56*b*, 56*c*, and 56*d* of the individual colors can be set by a user operation or the like.

Therefore, the printer device 13 according to each embodiment can easily change the configuration of the printer engine 15, according to the number of colors of the print image data (four colors of Y, C, M, and K or only color of K) or the number of heads used by the image output unit 50. At this time, the printer engine 15 may be provided with only the necessary units among the data transfer control units 30*a*, 30*b*, 30*c*, and 30*d* according to the required configuration.

For example, in a case of performing a full-color printing with four colors Y, C, M, and K, all of the data transfer control units 30*a*, 30*b*, 30*c*, and 30*d* may be provided in the printer engine 15. In the output control units 55*a* to 55*d*, the outputs of the data transfer control units 30*a*, 30*b*, 30*c*, and 30*d* may be connected to the heads 56*a*, 56*b*, 56*c*, and 56*d*, respectively. For example, in a case of performing a mono-color printing with only color K, it may be configured from a cost viewpoint that only the data transfer control unit 30*a* is provided with only the head 56*a*. And, in the output control unit 55*a*, the output of the data transfer control unit 30*a* can be connected to the head 56*a*. Alternatively, in the case of performing the mono-color printing with the only color K, it may be configured form a speed viewpoint that only the data transfer control unit 30*a* is provided with four heads 56*a*, 56*b*, 56*c* and 56*d*. And, in the output control unit 55*a*, the output of the data transfer control unit 30*a* can be connected to four heads 56*a*, 56*b*, 56*c* and 56*d*. In this case, the same color is printed overlappingly a plurality of times. Therefore, for example, a high speed printing may be realized by shortening the ejection time of ink from heads 56*a*, 56*b*, 56*c* and 56*d* respectively to ¼ of the usual ejection time and increasing the conveyance speed of sheet paper to quadruple of the usual conveyance speed.

Conveyance System of Printing Paper

Figure 9:
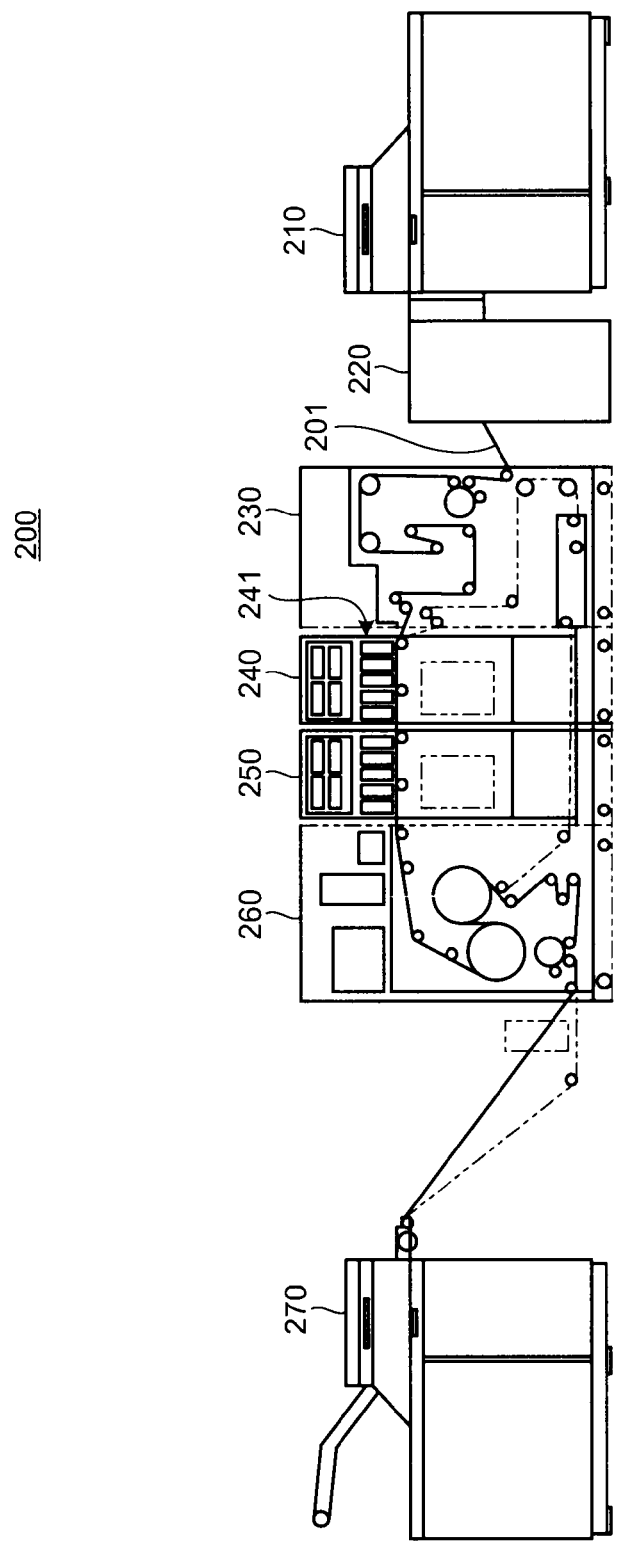
FIG. 9 is a schematic diagram illustrating an example of the configuration of a printer device including a conveyance system of paper that can be applied to the embodiment.

Referring to FIG. 4, the conveyance control unit 51 is connected to the paper conveyance control unit 22 by the conveyance control line 41 and controls conveyance of paper to which an image is formed by the image output unit 50 on the basis of the print image data. FIG. 9 schematically illustrates an example of the configuration of a printer device 200 that includes a conveyance system of paper that can be applied to each embodiment of the present invention. As described above, in each embodiment, the printer device 200 uses continuous paper as printing paper.

Printing paper 201 is fed from a printing paper feeding unit 210 to a first conveyance unit 230 through a power supply operation box 220. In the first conveyance unit 230, the printing paper 201 is conveyed through plural rollers by conveyance control of the conveyance control unit 51, is aligned, and is fed to printer engine units 240 and 250 that correspond to the printer engine 15.

In a printing unit 241 that corresponds to the image output unit 50, the printer engine units 240 and 250 perform printing according to print image data with respect to the printing paper 201 fed from the first conveyance unit 230. The printing paper 201 where the printing ends is discharged from the printer engine unit 250 by the conveyance control of the conveyance control unit 51 and is fed to a second conveyance unit 260. The printed paper 201 is conveyed to a predetermined position by the second conveyance unit 260 to be discharged, and is fed to a cutting unit 270. The printed paper 201 is cut by the cutting unit 270 according to perforations and divided into individual pages.

In this case, the printing paper continuously exists even in a path until the printing paper 201 is discharged from the second conveyance unit 260 after printing is performed on the printing paper 201 in the printer engine units 240 and 250, in order for the printer device 200 to perform printing on the printing paper 201 which is the continuous paper.

The configuration that includes the first conveyance unit 230, the printer engine units 240 and 250, and the second conveyance unit 260 is additionally prepared, the printed paper 201 that is discharged from the second conveyance unit 260 disposed on the front side is reversed and fed to the first conveyance unit 230 disposed on the rear side, and both-sided printing with respect to the printing paper 201 can be performed.

Detail of Printing Process Applicable to Each Embodiment

Next, a printing process applicable to each embodiment will be further described in detail. FIG. 10 illustrates an example of control information that is transmitted/received between the upper level device 10 and the printer controller 14 of the printer device 13 through the control line 12. In FIG. 10, the upper level device 10 is illustrated as a digital front end processor (DFE) and the printer controller 14 is illustrated as a PCTL. The control information roughly includes (i) job information, (ii) information indicating a printer status and a printing process, (iii) information indicating a printing condition, and (iv) information indicating a connection.

The job information is used to notify a job start and a job end. The job start includes a notification of the job start with respect to the printer controller 14 from the upper level device 10 and a response from the printer device 13 to the upper level device 10 with respect to the notification. The job end includes a notification of an end of all of the printing processes that are requested by the job start with respect to the printer controller 14 from the upper level device 10 and a response from the printer controller 14 to the upper level device 10 with respect to the notification. At the time of a response in the job start and the job end, a job identifier (JOBID) to identify a job is transmitted from the printer controller 14 to the upper level device 10.

The information indicating a printer status and a printing process includes a printing process reception start notification, a request/notification of printer information, a printing process start notification, a printing process request, a data transfer completion notification, a data reception completion notification, a printing process completion notification, a process status report, a service control (SC) notification, and an error occurrence and removal notification.

As for the printing process reception start notification, the printer device 13 notifies the upper level device 10 that the printer controller 14 is ready to receive a printing process. The request/notification of printer information includes a request of necessary printer information from the upper level device 10 to the printer controller 14, as well as a response to the request from the printer controller 14 to the upper level device 10.

The printing process start notification includes a notification from the upper level device 10 to the printer controller 14 indicating that the preparation of the print image data is completed and a response to the notification from the printer device 13 to the upper level device 10. The notification indicating that the preparation of the print image data is completed is notified in accordance with the sequence of the output of the print image data, page-by-page (process-by-process). It can be said that the page is a print unit by which a series of printing operation is performed.

The printing process request includes a notification of printing process from the printer controller 14 to the upper level device 10 and a response to the notification from the upper level device 10 to the printer controller 14. The printer controller 14 notifies the upper level device 10 of color information (yellow, cyan, magenta, or black) indicating the colors Y, C, M, and K to perform printing, a process identification number (process ID), and a plane identification number. Incidentally, the plane corresponds to each image based on each color print image data to be printed in one page. The printer controller 14 notifies these kinds of information for every plane in accordance with the sequence of requests from engine, i.e. the data transfer control units 30a, 30b, 30c and 30d. That is, the printer engine 15 retrieves the print image data composed of bitmap data from the upper level device 10.

As for the data transfer completion notification, the completion of transferring the print image data as for the requested plane is notified from the upper level device 10 to the printer controller 14. As for the data reception completion notification, the completion of receiving the print image data as for the requested plane is notified from the printer controller 14 to the upper level device 10. As for the printing process completion notification, the completion of print request for all pages (process) is notified from the upper level device 10 to the printer controller 14. As for the process status report, the print status of pages (process) is notified from the printer controller 14 to the upper level device 10. At this time, the printer controller 14 acquires from the printer engine 15 the information about feeding or discharging of sheets or the information about the print start timing, and adds the acquired information to the completion notification. Then, the notification to which the acquired information is added is transmitted to the upper level device 10.

As for the SC notification, an acquisition of obstacle information is requested from the upper level device 10 to the printer controller 14. The obstacle information acquired according to the request is notified from the printer controller 14 to the upper level device 10. As for the error occurrence and removal, an occurrence of any error and a removal thereof at the upper level device 10 is notified from the upper level device 10 to the printer controller 14.

The information indicating printing conditions includes setting the printing conditions, that is, a notification of the printing conditions from the upper level device 10 to the printer controller 14 and a response from the printer controller 14 to the notification. Examples of the printing conditions include a printing form, a printing type, feeding/discharging information, printing surface order, a printing paper size, a print data size, resolution and gradation, and color information.

The printing form indicates, for example, whether both-sided printing or a single-sided printing is performed on the printing paper 201. The printing type indicates whether print image data exists and thus the print image data is printed or the print image data does not exist and thus a white page is output without printing the print image data. The feeding/discharging information indicates identification information, such as a stacker of a discharging destination or a feeding origin of the printing paper 201. The printing surface order indicates whether printing is performed from a front surface to a back surface of the printing paper 201 or is performed from the back surface to the front surface. The printing paper size indicates, for example, the length of a page to be printed in a conveyance direction of the printing paper 201, when continuous paper is used as the printing paper 201. The print data size indicates a data size of the print image data. That is, the print data size indicates a size of the print image data corresponding to one page. The resolution and gradation indicates resolution and gradation of the case where the print image data is printed on the printing paper 201. The color information indicates, for example, whether to perform printing using a full color in which the colors Y, C, M, and K are used, or to perform printing using a single color in which only the color K is used.

The information indicating the connection includes registration and release, and specifically includes registration of information in each opponent between the upper level device 10 and the printer controller 14, and release of the registered information.

Figure 11:
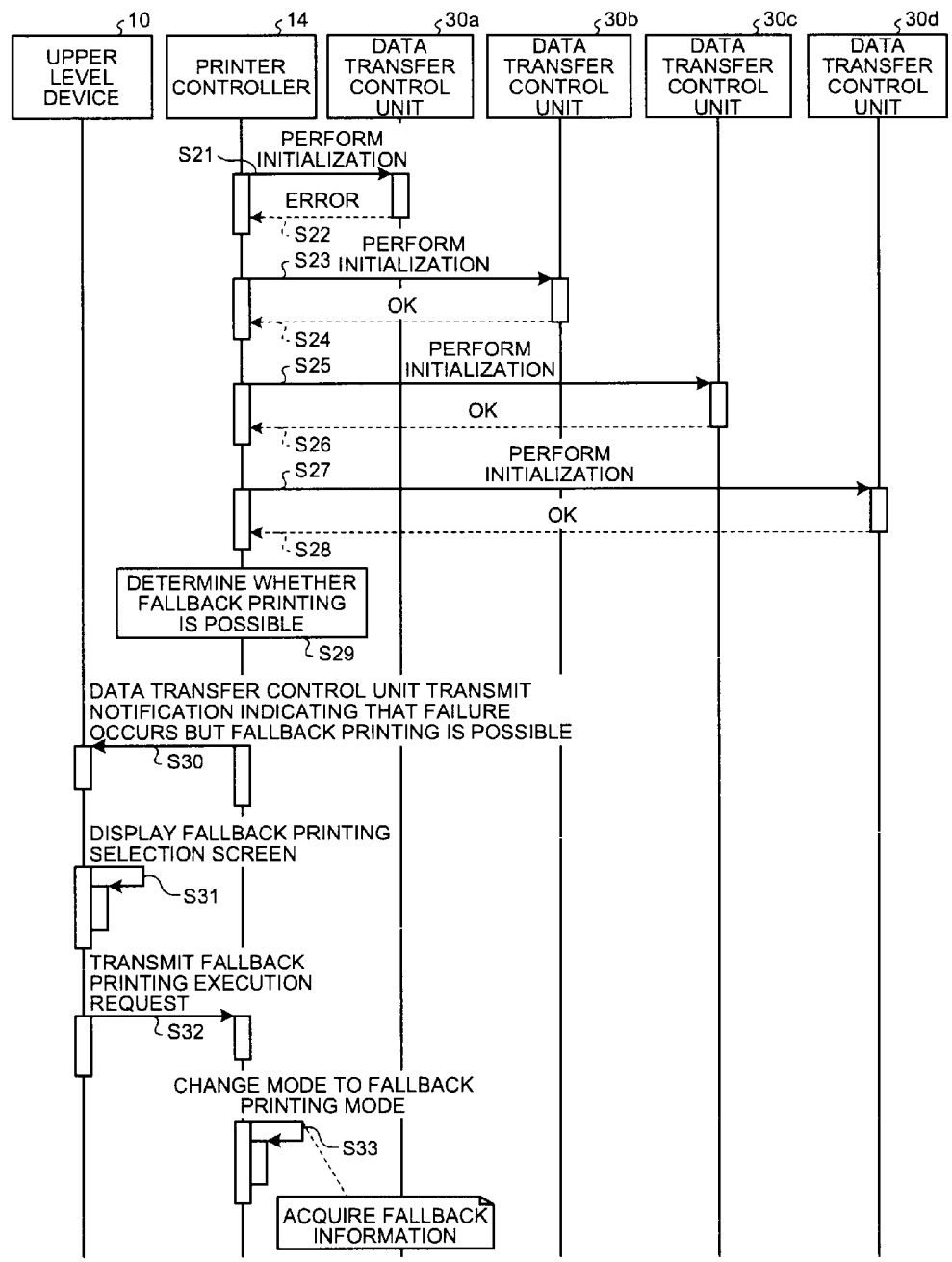
FIG. 11 is a sequence diagram illustrating an example of an initialization process.
Figure 12:
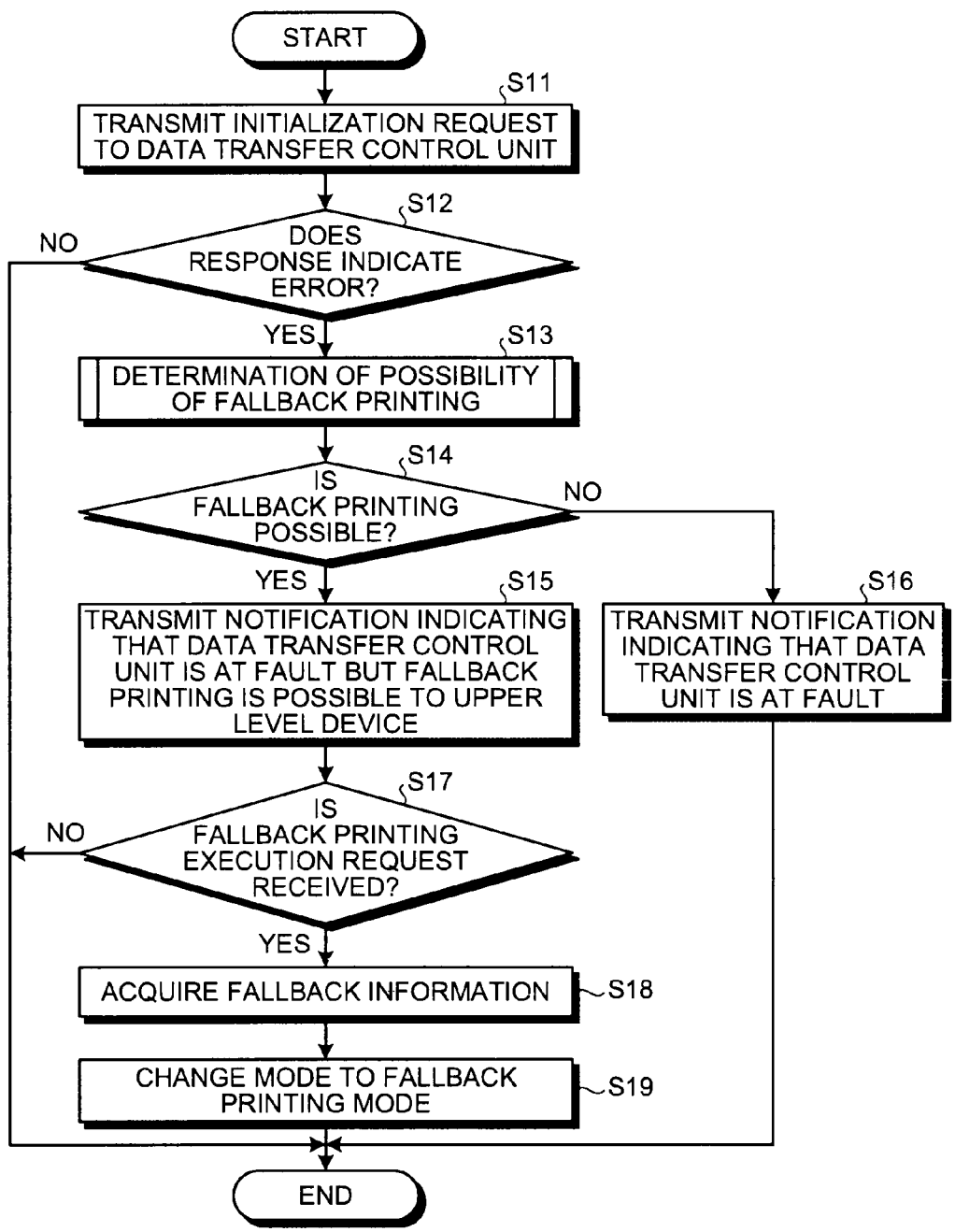
FIG. 12 is a flowchart illustrating an example of the initialization process executed by a printer controller.

A printing process according to the embodiment will be explained in detail below. FIG. 11 is a sequence diagram of a flow of an initialization process that is executed before the printing process. FIG. 12 is a flowchart illustrating an example of the initialization process executed by the printer controller 14. The initialization process is performed when, for example, the printer device 13 is powered on.

The control unit 23 of the printer controller 14 transmits an initialization request to the connected data transfer control units 30a, 30b, 30c, and 30d via the control signal transmitting/receiving unit 21 (Steps S21, S23, S25, S27, and S11). Each of the data transfer control units 30a, 30b, 30c, and 30d returns a response including information indicating whether an error (abnormality) has occurred or not, in response to the request.

The control unit 23 of the printer controller 14 receives the response from each of the data transfer control units 30a, 30b, 30c, and 30d via the control signal transmitting/receiving unit 21 and determines whether an error has occurred in any of the data transfer control units 30a, 30b, 30c, and 30d, on the basis of the contents of the response (Step S12).

When an error has not occurred in all of the data transfer control units 30a, 30b, 30c, and 30d (NO at Step S12), the control unit 23 terminates the initialization process.

In the example in FIG. 11, it is assumed that an error has occurred in the data transfer control unit 30a corresponding to Y (yellow) (Step S22), and an error has not occurred in the other data transfer control units 30b, 30c, and 30d (Steps S24, S26, and S28). When an error has occurred in any of the data transfer control units 30a, 30b, 30c, and 30d as described above (YES at Step S12), the control unit 23 analyzes the contents of the error and determines the possibility of fallback printing, that is, determines whether the fallback printing is possible or not (Steps S29 and S13).

The fallback printing means that, when an error occurs in any of the data transfer control units 30a, 30b, 30c, and 30d, printing is continued by any of the data transfer control units other than the data transfer control unit in which the error has occurred. In the fallback printing as described above, the printing is continued by a data transfer control unit as an alternative for the data transfer control unit in which the error has occurred, so that the number of the data transfer control units to be used becomes smaller than the number of the data transfer control units used in a normal printing process. Consequently, a printing speed in the fallback printing becomes slower than the normal printing speed. Therefore, whether to perform the fallback printing even at the printing speed that is slower than the normal printing speed is determined finally by a user.

Figure 13:
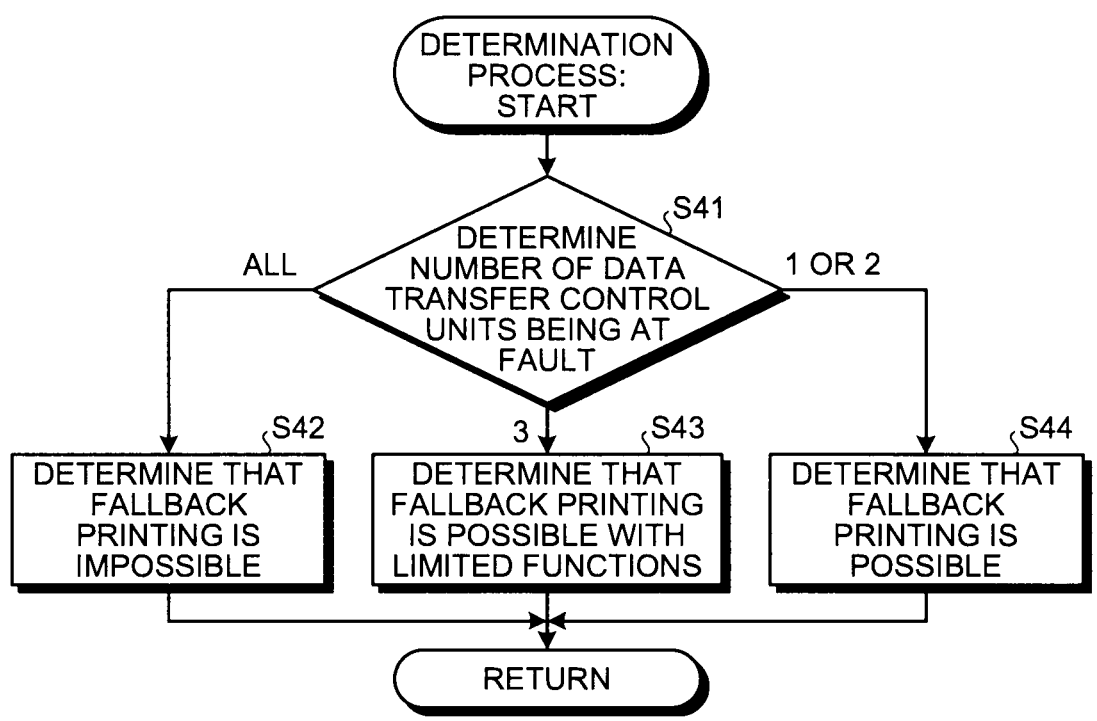
FIG. 13 is a flowchart illustrating an exemplary procedure of a process for determining the possibility of fallback printing, which is executed by a control unit.

FIG. 13 is a flowchart illustrating an exemplary procedure of a process for determining the possibility of the fallback printing, which is performed by the control unit 23. In this example, the control unit 23 determines whether the fallback printing is possible or not on the basis of the number of the data transfer control units in which an error has occurred.

The control unit 23 determines the number of the data transfer control units 30a, 30b, 30c, and 30d in which an error has occurred, i.e., which are at fault, on the basis of whether the contents of the response received from the data transfer control units 30a, 30b, 30c, and 30d indicates an error (Step S41).

When the number of the data transfer control units 30a, 30b, 30c, and 30d being at fault is equal to the total number, i.e., four, (all at Step S41), the control unit 23 determines that the fallback printing is impossible (Step S42). When the number of the data transfer control units 30a, 30b, 30c, and 30d being at fault is three, (3 at Step S41), the control unit 23 determines that the fallback printing is possible with limited functions by causing the remaining one data transfer control unit to continue printing (Step S43).

The situation in which the fallback printing with the limited functions is possible is that the fallback printing is possible when a part of the functions is limited such that, for example, the fallback printing is performed as monochrome printing even when color printing is specified.

At Step S41, when the number of the data transfer control units 30a, 30b, 30c, and 30d being at fault is one or two (1 or 2 at Step S41), the control unit 23 determines that the fallback printing is possible (Step S44). The situation in which the fallback printing is possible in this case is different from the situation at Step S43, and means that the fallback printing is possible without limitations on the functions.

The above determination is described by way of example only, and the present invention is not limited to this example. For example, it is possible to determine that the fallback printing is possible without limitations on the functions when at least one of the data transfer control units is not at fault. Furthermore, it may be configured that whether the fallback printing is possible or not is determined depending on the type of an error.

Referring back to FIGS. 11 and 12, after determining the possibility of the fallback printing at Step S13, the control unit 23 determines whether "the fallback printing is possible" is output as a determination result (Step S14). When the fallback printing is impossible (NO at Step S14), the control unit 23 transmits a notification indicating that the data transfer control unit is at fault to the upper level device 10 via the control information transmitting/receiving unit 20 (Step S16), and terminates the initialization process. It may be configured that, at Step S16, the control unit 23 additionally transmits a notification indicating that the fallback printing is impossible.

On the other hand, when the fallback printing is possible (including the situation in which the fallback printing is possible with limited functions) at Step S14 (YES at Step S14), the control unit 23 transmits a notification indicating that the data transfer control unit is at fault but the fallback printing is possible (or indicating that the fallback printing is possible with limited functions) to the upper level device 10 via the control information transmitting/receiving unit 20 (Steps S15 and S30).

Figure 14:
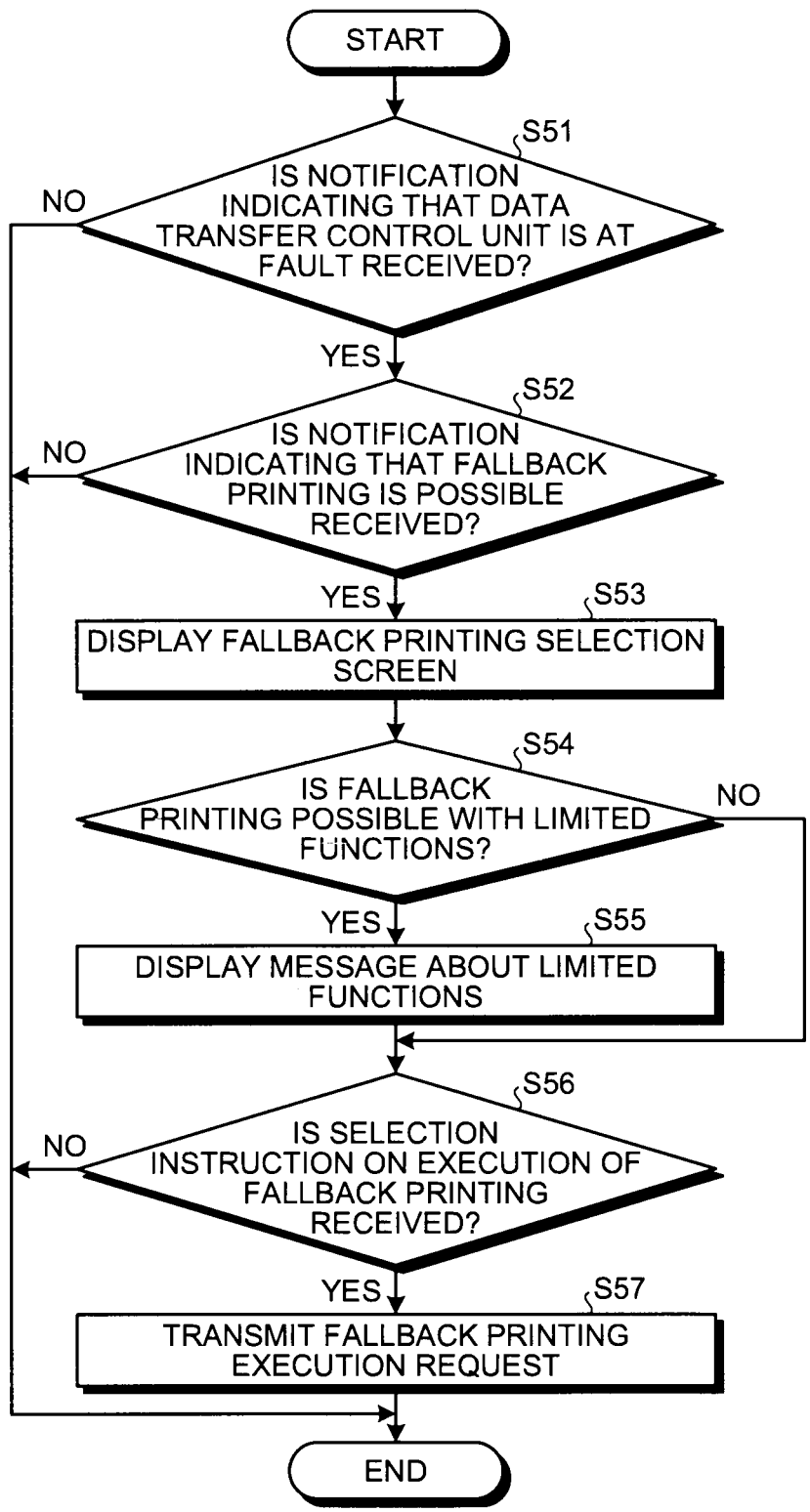
FIG. 14 is a flowchart illustrating a procedure of a process executed by the upper level device during the initialization process.

Explanation will be given of a process executed by the upper level device 10 when the upper level device 10 receives the notification indicating that the data transfer control unit is at fault. FIG. 14 is a flowchart illustrating a procedure of the process executed by the upper level device 10 during the initialization process.

When the upper level device 10 receives a notification indicating that any of the data transfer control units 30a, 30b, 30c, and 30d is at fault from the printer controller 14 (YES at Step S51), the control unit 124 determines whether a notification indicating that the fallback printing is possible is received together with the above notification (Step S52). When the notification indicating that the fallback printing is possible is not received (NO at Step S52), the process terminates.

On the other hand, when the notification indicating that the fallback printing is possible is received (YES at Step S52), the control unit 124 displays a fallback printing selection screen for confirming with a user whether or not to perform the fallback printing due to the failure of the data transfer control unit (Steps S31 and S53).

Figure 15:
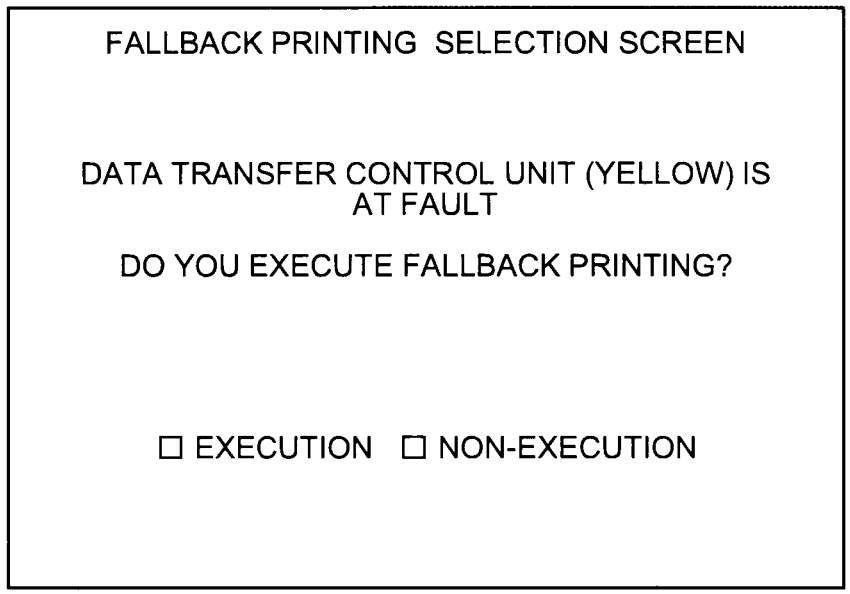
FIG. 15 is a schematic diagram illustrating an example of a fallback printing selection screen.

FIG. 15 is a schematic diagram illustrating an example of the fallback printing selection screen. As illustrated in FIG.

15, the fallback printing selection screen displays a message indicating a faulty data transfer control unit, a message for confirming whether or not to perform the fallback printing, and check boxes for allowing a user to select execution or non-execution of the fallback printing. In the example in FIG. 15, a message indicating that the data transfer control unit 30a corresponding to Y (yellow) is at fault is displayed by way of example.

The control unit 124 determines whether the notification indicating that the fallback printing is possible also indicates that the fallback printing is possible with limited functions (Step S54). When the notification indicates that the fallback printing is possible with limited functions (YES at Step S54), the control unit 124 displays a message about limited functions on the fallback printing selection screen (Step S55).

Figure 16:
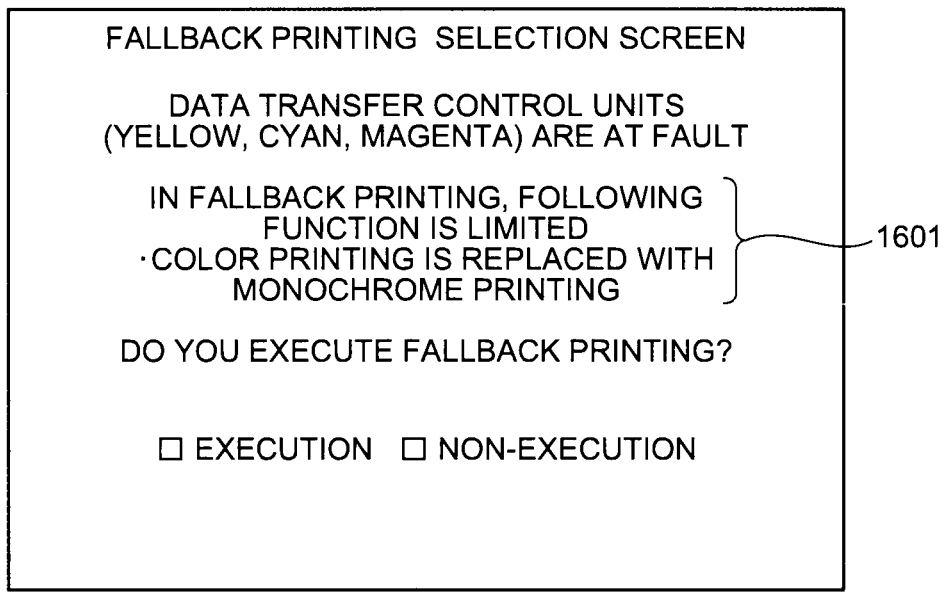
FIG. 16 is a schematic diagram illustrating an example of a fallback printing selection screen displaying a message about limited functions.

FIG. 16 is a schematic diagram illustrating an example of the fallback printing selection screen displaying a message about limited functions. When the fallback printing is possible with limited functions, as illustrated in FIG. 16, a message 1601 indicating that the functions are limited is displayed on the fallback printing selection screen. In the example in FIG. 16, a message is displayed that indicates that the three data transfer control units 30a, 30b, and 30c (Y, C, and M) are at fault and the functions are limited to monochrome printing.

The limitation on the functions is not limited to this example. Also, the fallback printing selection screen is not limited to the examples illustrated in FIGS. 15 and 16.

At Step S54, when the notification does not indicate that the fallback printing is possible with limited functions (NO at Step S54), the message about the limited functions as illustrated in FIG. 16 is not displayed.

The control unit 124 determines whether a selection instruction on execution of the fallback printing is received from a user via the fallback printing selection screen illustrated in FIG. 15 or FIG. 16 (Step S56). When the selection instruction on the execution of the fallback printing is not received from the user, that is, when an instruction indicating non-execution of the fallback printing is selected on the fallback printing selection screen (NO at Step S56), the control unit 124 terminates the process.

On the other hand, when receiving the selection instruction on the execution of the fallback printing from the user, that is, when execution of the fallback printing is selected on the fallback printing selection screen (YES at Step S56), the control unit 124 transmits a fallback printing execution request to the printer controller 14 (Steps S57 and S32). Thereby, the initialization process by the upper level device 10 terminates.

Referring back to FIG. 12, the control unit 23 of the printer controller 14 determines whether the fallback printing execution request is received from the upper level device 10 via the control information transmitting/receiving unit 20 (Step S17). When the fallback printing execution request is not received from the upper level device 10 (NO at Step S17), the control unit 23 terminates the initialization process.

On the other hand, when receiving the fallback printing execution request from the upper level device 10 (YES at Step S17), the control unit 23 acquires fallback information that is stored in the ROM 324 or the RAM 323 in advance (Step S18), and sets a fallback printing mode for performing the fallback printing to the faulty data transfer control unit (Steps S19 and S33). The control unit 23 sets a normal printing mode for performing normal printing to the data transfer control units other than the faulty data transfer control unit. Thereby, the initialization process terminates. The fallback printing mode and the normal printing mode are set to a transfer management table (see FIG. 19) to be described below.

The fallback information is data for specifying a data transfer control unit that is used as an alternative when a failure occurs in the data transfer control units, for each faulty data transfer control unit. FIG. 17 is an explanatory diagram illustrating an example of the fallback information. As illustrated in FIG. 17, the types of the data transfer control units are represented by Y (yellow), C (Cyan), M (magenta), and K (black), and an alternate data transfer control unit is specified for each faulty data transfer control unit and each combination of faulty data transfer control units.

Specifically, in the fallback information illustrated in FIG. 17, for example, the data transfer control unit 30b corresponding to C (cyan) is specified as an alternative to be used when the data transfer control unit 30a corresponding to Y (yellow) is at fault. The fallback printing becomes possible by causing the data transfer control unit as an alternative for the faulty data transfer control unit to continue printing according to the fallback information.

In the example in FIG. 17, the alternate data transfer control unit prints all pages. However, it is possible to change the alternate data transfer control unit for each page. For example, the fallback information may contain information indicating that the data transfer control units 30b, 30c, and 30d are sequentially used as alternatives for respective pages when an error occurs in the data transfer control unit 30a corresponding to the color Y. With this configuration, it becomes possible to realize load balancing at the time of the fallback printing.

FIG. 18 is an explanatory diagram illustrating an example of the fallback information used when an alternate data transfer control unit is changed for each page. As illustrated in FIG. 18, a data transfer control unit as an alternative for each page is specified in advance for each faulty data transfer control unit and each combination of faulty data transfer control units.

According to the embodiment, the fallback information is stored in the ROM 324 or the RAM 323 in advance. However, it may be configured that the fallback information is set by using, for example, a dip switch. Furthermore, it may be configured that an alternate data transfer control unit is dynamically determined such that, for example, a transfer data amount of the image data received from the upper level device 10 is counted and a data transfer control unit with the transfer data amount smaller than a predetermined amount is determined as an alternative on the basis of the counted transfer data amount.

Transfer Management Table

The transfer management table used in the printing process will be described. FIG. 19 is a diagram illustrating an example of the transfer management table according to the embodiment. The transfer management table contains information that is common to all colors C, M, Y, and K and information for each color. Each of the information common to all colors and the information for each color contains data transfer information used for transferring print image data from the upper level device 10 and print information related to printing instructions with respect to the image output unit 50. A management form of each information contained in the transfer management table is not limited to a table form, and each information may be managed in other data management forms.

The information common to all colors in the embodiment will be described. In information common to all colors, a page identifier PBID and a data amount for each page are contained as information other than the data transfer information and the print information. The page identifier PBID is a page identifier for identifying a printing page and the transfer management table is identified by the page identifier PBID. The data amount for each page is the number of colors that are used in the page identified by the page identified PBID. For example, a value "1" is set for a monochrome and a value "4" is set for a full color, as the data amount.

The data transfer information in the information common to all colors according to the embodiment contain a data transfer origin address, a data storage destination address, and a data transfer size. The data transfer origin address indicates an address where the print image data of the page identified by the page identifier PBID is stored in the upper level device 10. The data transfer origin address designates the print image data in a raster (line) unit for example.

According to the embodiment, the same address is used as the transfer origin address for the print image data of each color. For example, in the upper level device 10, the print image data of each color is stored in the storage unit 122 illustrated in FIG. 3. Specifically, the print image data of each color is stored at an address identified by each of data lines 11a, 11b, 11c, and 11d or by each color, in the RAM 103 illustrated in FIG. 2.

The data storage destination address is an address indicated by the input pointer. Therefore, the data storage destination address is updated every time the input pointer is updated. The data transfer size indicates a data size of the print image data that is transferred according to a request from each of the data transfer control units 30a to 30d. For example, the data transfer size is a data size of the print image data of the page identified by the page identifier PBID.

The data transfer size includes a boundary adjustment size for adjusting the size of the print image data in a predetermined unit (for example, a byte unit). When one page is printed, the print image data with the data size indicated by the data transfer size is stored in each of the memories 31a to 31d. For example, a value obtained by adding the boundary adjustment size to a "print data size" of the information indicated by (3) printing conditions described with reference to FIG. 10 becomes the data transfer size.

The print information in the information common to all colors that is applied to the first embodiment will be described. The print information includes resolution and gradation as information of print image data to be printed and includes a paper feeding length, a paper width, a printing surface (front surface/back surface), a printing prohibited area (upper side/lower side/left side/right side), and image information as information related to a printing object. The image information includes a bitmap printing position X and a bitmap printing position Y and an X direction effective size and a Y direction effective size.

In the information on the print image data to be printed, the resolution indicates printing resolution of each of a main-scanning direction and a sub-scanning direction. The gradation indicates the number of bits per pixel. The paper feeding length represents the length of one page in a feeding direction of the printing paper by the number of dots. The paper width represents the length of the printing paper in a width direction by the number of dots. The printing surface indicates whether the print image data of the corresponding page is printed on the front surface or the back surface of the printing paper.

The upper, lower, left, and right sides in the printing prohibited area represent an area where printing is prohibited by the number of dots from an upper end (head of the paper feeding direction), a lower end (rear end of the paper feeding direction), a left end (left end of the paper width direction toward the paper feeding direction), and a right end (rear end of the paper width direction toward the paper feeding direction) of a page area.

The bitmap printing positions X and Y of the image information represent an address (coordinates) of a print start position by the number of dots, when the upper left (head of the paper feeding direction and left end of the paper width direction) of the page area is set to an original point. The X direction effective size in the image information represents a size excluding the boundary adjustment area in an X direction (paper width direction) by the number of dots. The boundary adjustment area is provided to adjust a data size in a predetermined unit, when a data size of one raster data includes fractions of a predetermined unit or less (for example, byte unit). The Y direction effective size represents a size in a Y direction (paper feeding direction) by the number of dots. That is, the X direction effective size indicates an effective size that is printed by one raster data and the Y direction effective size indicate the number of rasters (number of lines) printed with the X direction effective size.

That is, an area indicated by the X direction effective size and the Y direction effective size with the bitmap printing positions X and Y that are set to the upper left becomes the printing area. In an area that overlaps the printing prohibited area in the printing area, printing is not performed.

The information for each color according to the embodiment will be described. The information for each color contains a Color identifier that indicates the printing color for which information is described among the colors C, M, Y, and K, as information other than the data transfer information and the print information. The information for each color has the common configuration; therefore, information where the Color identifier is "Cyan" will be described. The information management table contains the information for each color with respect to each of the colors C, M, Y, and K.

The data transfer information in the information for each color according to the first embodiment contains information that indicates whether data transfer is needed. The information that indicates whether the data transfer is needed indicates whether transfer of print image data of the corresponding printing color is needed. For example, in the case of white paper, that is, when printing is not performed, the information that indicates whether the data transfer is needed is set to "non-necessity", with respect to all of the colors C, M, Y, and K. With respect to colors other than the colors specified by the Color (Cyan, Magenta, Yellow, and Black) identifiers, the information that indicates whether the data transfer is needed is set to "non-necessity".

The print information in the information for each color according to the embodiment contains information that indicates whether printing is needed. The information that indicates whether the printing is needed indicates whether printing of print image data of the corresponding printing color is needed. For example, in the case of white paper, that is, when printing is not performed, the information that indicates whether the printing is needed is set to "non-necessity", with respect to all of the colors C, M, Y, and K. With respect to colors other than the colors specified by the Colors, the information that indicates whether the data transfer is needed is set to "non-necessity".

A fallback flag indicates whether a mode is the fallback printing mode or the normal printing mode that is used for performing normal printing. When changing the mode to the fallback printing mode for a faulty data transfer control unit, the control unit 23 of the printer controller 14 sets ON to the fallback flag in the control information relating to the color of the faulty data transfer control unit and to the color of the alternate data transfer control unit. In the case of the normal printing mode, the fallback flag is set to OFF. As illustrated in FIG. 19, the fallback flag is contained in the control information for each color.

Printing Sequence

Figure 21:
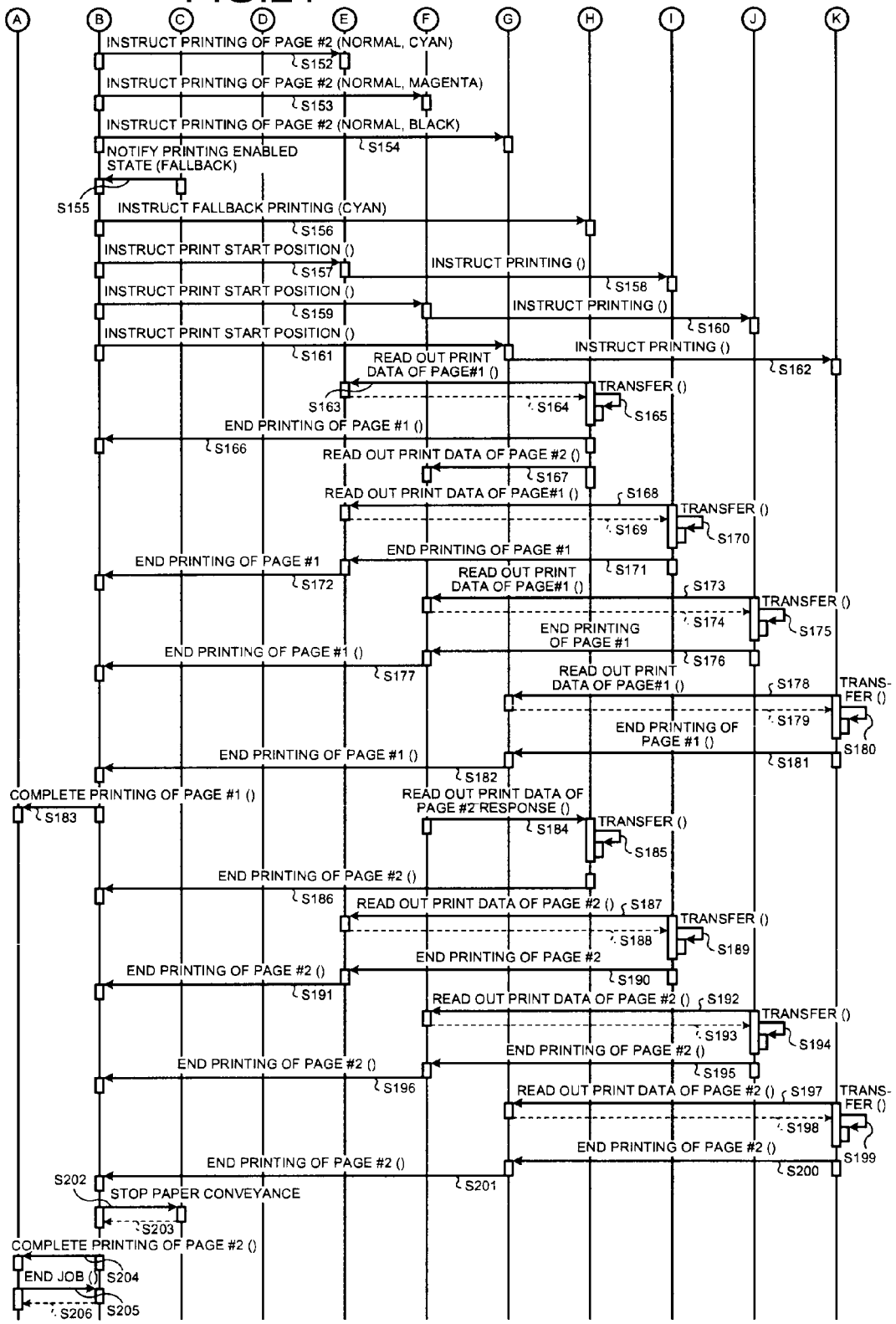
FIG. 21 is a sequence diagram illustrating an example of the printing process according to the embodiment.

A printing process according to the embodiment will be described. FIGS. 20 and 21 are sequence diagrams illustrating an example of the printing process according to the embodiment. In FIGS. 20 and 21, reference symbols A to K indicate that processes proceed to the same symbols between the drawings.

In this example, two pages are printed in total by a print job. In the following, it is assumed that an error has occurred in the data transfer control unit 30a of the color Y (i.e., the data transfer control unit 30a of the color Y is at fault) and the mode is changed to the fallback printing mode. Moreover, in the following example, the fallback printing is executed using the fallback information illustrated in FIG. 18. Specifically, the data transfer control unit 30b of the color C performs printing of the first page as an alternative for the data transfer control unit 30a of the color Y, and the data transfer control unit 30c of the color M performs printing of the second page as an alternative for the data transfer control unit 30a of the color Y.

The upper level device 10 transmits control information indicating a job start to the printer controller 14 via the control line 12 (Step S101). The control unit 23 of the printer controller 14 transmits control information for returning a response indicating, for example, a job identifier, to the upper level device 10 via the control line 12 in response to the control information (Step S102). Also, the control unit 23 of the printer controller 14 acquires resources for executing the job according to the job start.

The control unit 23 of the printer controller 14 transmits a request for print information including printing conditions and the like, to the upper level device 10 via the control line 12 (Step S103). The upper level device 10 transmits control information for setting the printing conditions to the printer controller 14 via the control line 12 (Step S104). Examples of the printing conditions include a printing form, a printing type, feeding/discharging information, printing surface order, a printing paper size, a print data size, resolution and gradation, and color information. When the printer controller 14 receives the control information, various printing conditions contained in the received control information are written in a register of the control unit 23 of the printer controller 14, so that the printing conditions are set.

The control unit 23 of the printer controller 14 sets a paper feeding length to the conveyance control unit 51 by referring to the condition such as the printing paper size (Step S105). The paper feeding length is, for example, a size of a page in the conveying direction.

The control unit 23 of the printer controller 14 transmits the transfer management table illustrated in FIG. 19 and the fallback information (in this example, see FIG. 18) to the data transfer control units 30b, 30c, and 30d that are not at fault, via the control signal transmitting/receiving unit 21 (Steps S301, S302, and S303). Consequently, each of the data transfer control units 30b, 30c, and 30d can recognize that the fallback printing mode is activated and for what page each of the data transfer control units 30b, 30c, and 30d is used as an alternative for the data transfer control unit 30a being at fault, on the basis of the received transfer management table and the fallback information.

Each of the data transfer control units 30b, 30c, and 30d can also acquire the data transfer origin address of the print image data of each color, from the transfer management table. For example, the data transfer control unit 30b, which is used as an alternative for the data transfer control unit 30a with respect to the first page, can read out the print image data of the color C from the data transfer origin address of the color Y.

The transfer management table and the fallback information can be transmitted at any timing before the printer controller 14 transmits a data transfer start request for the first page #1 to each of the data transfer control units 30b, 30c, and 30d.

The control unit 23 of the printer controller 14 transmits the fallback information (in this example, see FIG. 18) to each of the output control units 55a, 55b, 55c, and 55d via the control signal transmitting/receiving unit 21 (Steps S304, S305, S306, and S307).

The control unit 23 of the printer controller 14 transmits control information for requesting the print image data of the first page of the color Y to the upper level device 10 via the control line 12 (Step S106). The control information contains a process identification number for specifying a process notified by the upper level device 10 and color information for specifying the color Y. The upper level device 10 returns control information containing an image identification number to the printer controller 14 as a response to the control information (Step S107).

Upon receiving the control information, the control unit 23 of the printer controller 14 sends a transfer start request of the print image data of the color Y to the data transfer control unit 30b of the color C as specified by the fallback information, instead of sending the request to the data transfer control unit 30a because an error has occurred in the data transfer control unit 30a of the color Y (Step S108).

Upon receiving the request, at Step S109, the data transfer control unit 30b requests the upper level device 10 to transfer the print image data of a plane of the color Y to the upper level device 10 via the data line 11b, and the upper level device 10 transfers the print image data of the color Y to the data transfer control unit 30b in response to the request (Step S109). The transferred print image data is stored in an area allocated for the print image data of the first page, in a memory of the data transfer control unit 30b.

When the transfer of the print image data from the upper level device 10 via the data line 11b is completed, the data transfer control unit 30b transmits a data transfer completion notification to the printer controller 14 (Step S110).

The same processes as those at Steps S106 to S110 are repeated for each of the colors C, M, and K, so that the print image data of a corresponding color is transferred to each of the data transfer control units 30b, 30c, and 30d via each of the data lines 11b, 11c, and 11d from the upper level device 10 (Steps S111 to S125). In this example, because no error has occurred in the data transfer control units 30b, 30c, and 30d for the colors C, M, and Y, each of the data transfer control units 30b, 30c, and 30d acquires the print image data of a corresponding color from the upper level device 10.

Upon receiving the data transfer completion notification of the first page from all of the data transfer control units 30b, 30c, and 30d, the control unit 23 of the printer controller 14 requests the conveyance control unit 51 to start paper conveyance (Step S126). The conveyance control unit 51 starts conveyance of a printing paper at a predetermined speed in response to the request. In addition to the request to the conveyance control unit 51 to start the paper conveyance, the control unit 23 of the printer controller 14 instructs each of the data transfer control units 30b, 30c, and 30d to start printing of the first page.

In this example, the control unit 23 of the printer controller 14 firstly transmits a first-page printing instruction including the designation of the fallback printing for the color Y to the data transfer control unit 30b (Step S127). The control unit 23 of the printer controller 14 also transmits a first-page printing instruction including the designation of the normal printing for the color C to the data transfer control unit 30b (Step S128). Similarly, the control unit 23 transmits a first-page printing instruction including the designation of the normal printing for the colors M and K to the respective data transfer control units 30c and 30d (Steps S129 and S130).

According to the embodiment, each of the data transfer control units 30b, 30c, and 30d receives the transfer management table, in which ON/OFF of the fallback flag is set, and the fallback information at Steps S301 to S303. Therefore, it may be configured that the control unit 23 of the printer controller 14 transmits the printing instruction to each of the data transfer control units 30b, 30c, and 30d without including the designation of the fallback information and the designation of the normal printing in the printing instruction.

The control unit 23 of the printer controller 14 requests each of the data transfer control units 30a, 30b, 30c, and 30d to start data transfer of the second page (page #2) in response to the data transfer completion notification of the print image data of the first page.

In this example, the control unit 23 of the printer controller 14 firstly transmits control information for requesting the print image data of the second page of the color Y to the upper level device 10 via the control line 12 (Step S131). The upper level device 10 returns control information containing an image identification number to the printer controller 14 as a response to the control information (Step S132).

Upon receiving the control information, the control unit 23 of the printer controller 14 sends a transfer start request of the print image data of the color Y to the data transfer control unit 30c of the color M as specified in the fallback information as an alternative used for the second page (see FIG. 18), instead of sending the request to the data transfer control unit 30a because the data transfer control unit 30a of the color Y is at fault (Step S133). As described above, in FIG. 20, an example is illustrated in which the data transfer control unit used as an alternative for the data transfer control unit 30a in which an error has occurred is changed for each page. Specifically, in this example, the data transfer control unit 30b serves as an alternative used for the first page and the data transfer control unit 30c serves as an alternative used for the second page.

Upon receiving the request, at Step S134, the data transfer control unit 30c requests the upper level device 10 to transfer the print image data of a plane of the color Y to the upper level device 10 via the data line 11b, and the upper level device 10 transfers the print image data of the color Y to the data transfer control unit 30c in response to the request (Step S134). When the transfer of the print image data from the upper level device 10 via the data line 11b is completed, the data transfer control unit 30c transmits a data transfer completion notification to the printer controller 14 (Step S135).

The same processes as those at Steps S131 to S135 are repeated for each of the color C, M, and K, so that the print image data of a corresponding color is transferred to each of the data transfer control units 30b, 30c, and 30d via each of the data lines 11b, 11c, and 11d from the upper level device 10 (Steps S136 to S150).

The control unit 23 of the printer controller 14 instructs each of the data transfer control units 30b, 30c, and 30d to start printing of the second page.

In this example, the control unit 23 of the printer controller 14 firstly transmits a second-page printing instruction including the designation of the fallback printing for the color Y to the data transfer control unit 30c (Step S151). The control unit 23 of the printer controller 14 also transmits a second-page printing instruction including the designation of the normal printing for the color C to the data transfer control unit 30b (Step S152). Similarly, the control unit 23 transmits a second-page printing instruction including the designation of the normal printing for the colors M and K to the respective data transfer control units 30c and 30d (Steps S153 and S154).

When the printing paper 201 reaches a predetermined position, the conveyance control unit 51 notifies the printer controller 14 of a printing enabled state (Step S155). The control unit 23 of the printer controller 14 transmits a fallback printing instruction to an image output control unit 50a corresponding to the color Y, in response to the printing enabled state report received from the conveyance control unit 51 (Step S156).

The control unit 23 of the printer controller 14 instructs each of the data transfer control units 30b, 30c, and 30d about the print start position (Steps S157, S159, and S161). Each of the data transfer control units 30b, 30c, and 30d instructs a corresponding one of image output control units 50b, 50c, and 50d to perform printing in accordance with the print start position instruction (Steps S158, S160, and S162).

Upon receiving the fallback printing instruction, the image output control unit 50a requests the data transfer control unit 30b, instead of the data transfer control unit 30a, to read out the print image data of the first page by referring to the fallback information received at Steps S304 to S307 (Step S163). The image output control unit 50a acquires the print image data from the data transfer control unit 30b (Step S164), and transfers the print image data to the printing paper 201 (Step S165). The image output control unit 50a transmits a printing completion notification of the first page to the printer controller 14 (Step S166). Thereafter, the image output control unit 50a requests the data transfer control unit 30c to read out the print image data of the second page (Step S167).

Meanwhile, because the normal printing is instructed for the colors C, M, and K, the image output control units 50b, 50c, and 50d corresponding to the respective colors read out print image data from the data transfer control units 30b, 30c, and 30d, respectively, and transfer the print image data to the printing paper 201.

For example, for the color C, the image output control unit 50b requests the data transfer control unit 30b to read out the print image data of the first page (Step S168). The image output control unit 50b acquires the print image data from the data transfer control unit 30b (Step S169), and transfers the print image data to the printing paper 201 (Step S170). The image output control unit 50b transmits a printing completion notification of the first page to the data transfer control unit 30b (Step S171). The data transfer control unit 30b transmits the printing completion notification of the first page to the printer controller 14 (Step S172). For the other colors M and K, the same processes as those at Steps S168 to S172 are repeated (Steps S173 to S182).

When the printing of the first page for all colors is completed as described above, the control unit 23 of the printer controller 14 notifies the upper level device 10 of the completion of the printing of the first page (Step S183).

The data transfer control unit 30c that has been requested to read out the print image data of the second page at Step S167 reads out the print image data of the second page in response to the request and transmits the print image data to the image output control unit 50a (Step S184). The image output control unit 50a transfers the read-out print image data to the printing paper 201 (Step S185), and transmits a printing completion notification of the second page to the printer controller 14 (Step S186).

The printing processes of the second page of the colors C, M, and K at Steps S187 to S201 are the same as those at Step S168 to S182; therefore, the same explanation will not be repeated.

When the printing of all of the pages, i.e., for the first and the second page, is completed, the control unit 23 of the printer controller 14 requests the conveyance control unit 51 to stop the conveyance of the printing paper (Step S202). The conveyance control unit 51 stops the conveyance of the printing paper in response to the request and notifies the printer controller 14 of the stop of the conveyance (Step S203). When the printing of the second page for all colors is completed, the control unit 23 of the printer controller 14 notifies the upper level device 10 of the completion of the printing of the second page (Step S204).

When receiving, from the printer controller 14, a discharge report corresponding to the information indicating the number of the printing pages as contained in the control information transmitted at Step S104, the upper level device 10 determines that the printing based on the job for which the start is notified at Step S101 is completed, and transmits control information on the end of the job to the printer controller 14 (Step S205). Upon receiving the control information, the control unit 23 of the printer controller 14 transmits control information on the response containing the identification number of the specified job to the upper level device 10 (Step S206). Consequently, a series of the printing processes terminates.

As described above, according to the printing device of the embodiment, even when any of the data transfer control unit is at fault, or even when any of the data lines (data communication paths) from the upper level device is at fault, it is possible to transfer print data by using a data transfer control unit that is not at fault or a data line that is not at fault, via an image output control unit. Therefore, it is possible to provide a printing system capable of continuing the operation without interrupting the printing.

According to one aspect of the present invention, it is possible to increase a data transfer speed between an upper level device and a printing device, and it is possible to continue operations even when a data transfer control unit that controls the data transfer is at fault.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing device comprising:
   a plurality of data transfer control units associated with different individual colors, each of which stores image data of an individual color transferred from an upper level device in a storage unit, wherein the image data transferred from the upper level device includes raster image data rasterized by a raster image processor included in the upper level device;
   a plurality of output control units associated with the different individual colors which are provided correspondingly to the data transfer control units and each of which controls printing of the image data of a respective individual color stored by a specified one of the data transfer control units; and
   a print control unit that, when abnormality has occurred in any of the data transfer control units associated with the different individual colors, transmits a transfer instruction on the image data of the individual color that is to be transferred originally by the data transfer control unit associated with the individual color in which the abnormality has occurred, to an alternate data transfer control unit associated with a different individual color among the data transfer control units in which no abnormality has occurred, and instructs an output control unit corresponding to the data transfer control unit associated with the individual color in which the abnormality has occurred to print the image data of the individual color that is stored by the alternate data transfer control unit associated with the different individual color.

2. The printing device according to claim 1, wherein when abnormality has occurred in any of the data transfer control units associated with the different individual colors, the print control unit transmits a transfer instruction on the image data that is to be transferred originally by the data transfer control unit associated with the individual color in which the abnormality has occurred, to a data transfer control unit associated with the different individual color that is specified in advance with respect to the data transfer control unit in which the abnormality has occurred.

3. The printing device according to claim 1, wherein when abnormality has occurred in any of the data transfer control units associated with the different individual colors, the print control unit transmits a transfer instruction on the image data that is to be transferred originally by the data transfer control unit associated with the individual color in which the abnormality has occurred, to a data transfer control unit associated with the different individual color that is specified in advance for each page to be printed by the data transfer control unit in which the abnormality has occurred, from among the data transfer control units associated with the different individual colors in which no abnormality has occurred.

4. The printing device according to claim 1, wherein when abnormality has occurred in any of the data transfer control units associated with the different individual colors, the print control unit determines an alternate data transfer control unit associated with the different individual color from among the data transfer control units in which no abnormality has occurred, on the basis of a transfer data amount, and transmits a transfer instruction on the image data that is to be transferred originally by the data transfer control unit associated with the individual color in which the abnormality has occurred to the determined alternate data transfer control unit associated with the different individual color.

5. A method of controlling a printing device, comprising:
   storing, by a plurality of data transfer control units associated with different individual colors, image data of an individual color transferred from an upper level device in a storage unit,
   wherein the image data transferred from the upper level device includes raster image data rasterized by a raster image processor included in the upper level device;
   controlling, by each of output control units associated with the different individual colors provided correspondingly to the data transfer controls units, printing of the image data of a respective individual color stored by a specified one of the data transfer control units; and
   controlling, when abnormality has occurred in any of the data transfer control units associated with the different individual colors, by the data transfer control unit associated with the individual color in which the abnormality has occurred, transmission of a transfer instruction on the image data of the individual color that is to be transferred originally by the data transfer control unit associated with the individual color in which the abnormality has occurred, to an alternate data transfer control unit associated with a different individual color among the data transfer control units in which no abnormality has occurred, and transmission of an instruction to an output control unit corresponding to the data transfer control unit associated with the individual color in which the abnormality has occurred to perform printing of the image data of the individual color that is stored by the alternate data transfer control unit associated with the different individual color.

* * * * *